United States Patent [19]

Hashimoto et al.

[11] Patent Number: 5,291,233
[45] Date of Patent: Mar. 1, 1994

[54] CAMERA HAVING AN AUTO ZOOM FUNCTION

[75] Inventors: Takeshi Hashimoto; Masayuki Ikemura; Kazuo Kimura; Yoshiaki Hata; Kohtaro Hayashi; Hiroshi Ootsuka; Motohiro Nakanishi, all of Osaka, Japan

[73] Assignee: Minolta Camera Kabushiki Kaisha, Osaka, Japan

[21] Appl. No.: 471,522

[22] Filed: Jan. 29, 1990

[30] Foreign Application Priority Data

| Jan. 30, 1989 | [JP] | Japan | 1-21351 |
| Jan. 30, 1989 | [JP] | Japan | 1-21352 |
| Jan. 30, 1989 | [JP] | Japan | 1-21353 |
| Jan. 30, 1989 | [JP] | Japan | 1-21354 |
| Jan. 30, 1989 | [JP] | Japan | 1-21355 |
| Jan. 30, 1989 | [JP] | Japan | 1-21356 |
| Jan. 30, 1989 | [JP] | Japan | 1-21357 |
| Jan. 30, 1989 | [JP] | Japan | 1-21358 |
| Jan. 30, 1989 | [JP] | Japan | 1-21359 |
| Jan. 30, 1989 | [JP] | Japan | 1-21360 |
| Jan. 30, 1989 | [JP] | Japan | 1-21361 |
| Jan. 30, 1989 | [JP] | Japan | 1-21362 |
| Jan. 30, 1989 | [JP] | Japan | 1-21363 |

[51] Int. Cl.$^5$ .............................. G03B 13/00
[52] U.S. Cl. ....................... 354/400; 354/195.12
[58] Field of Search .................... 354/400–409, 354/195.12

[56] References Cited

U.S. PATENT DOCUMENTS

| 4,652,104 | 3/1987 | Harvey | 354/222 |
| 4,786,987 | 11/1988 | Fujimura et al. | 354/409 |
| 4,878,080 | 10/1989 | Takehana et al. | 354/403 |
| 4,907,025 | 3/1990 | Ikeno et al. | 354/400 |
| 4,942,417 | 7/1990 | Miyazawa et al. | 354/400 |
| 4,951,075 | 8/1990 | Tokumaru et al. | 354/400 |

FOREIGN PATENT DOCUMENTS

| 56-78811 | 6/1981 | Japan . |
| 62-118328 | 5/1987 | Japan . |
| 63-193117 | 8/1988 | Japan . |
| 63-220118 | 9/1988 | Japan . |

OTHER PUBLICATIONS

"Modern Test: Maxxum 9000: Professional Multi-Mode Autofocus SLR from Minolta" *Modern Photography* May 1986.
Brochure of Nikon Zoom-Toner 500.

*Primary Examiner*—David M. Gray
*Attorney, Agent, or Firm*—Burns, Doane, Swecker & Mathis

[57] ABSTRACT

A camera having an auto zoom function includes: a taking lens for photographing an object; a distance measuring device for measuring a distance to the object; a magnification setting device for setting a photographing magnification for the object; and a focal length calculator for calculating a focal length of the taking lens to obtain the photographing magnification set with respect to the distance to the object. Auto zoom operation is carried out by automatic movement of the taking lens so that the focal length of the taking lens may be equal to the calculated focal length.

22 Claims, 45 Drawing Sheets

FIG.3

| ZOOM POSITION | TYPICAL f VALUE | ENCODER PATTERN (BLACK:ON) | FUNCTION (L:ON H:OFF) S10 S9 S8 S7 S6 | HEXADECIMAL CODE |
|---|---|---|---|---|
| 1 | 90mm(TELE END) | | H L H H H | 1 7 H |
| 2 | 88mm | | H L H H L | 1 6 H |
| 3 | 85mm | | H L H L L | 1 4 H |
| 4 | 82mm | | H L H L H | 1 5 H |
| 5 | 79mm | | H L L L H | 1 1 H |
| 6 | 76mm | | H L L L L | 1 0 H |
| 7 | 73mm | | H L L H L | 1 2 H |
| 8 | 70mm | | H L L H H | 1 3 H |
| 9 | 67mm | | L L L H H | 0 3 H |
| 10 | 64mm | | L L L H L | 0 2 H |
| 11 | 61mm | | L L L L L | 0 0 H |
| 12 | 58mm | | L L L L H | 0 1 H |
| 13 | 55mm | | L L H L H | 0 5 H |
| 14 | 52mm | | L L H L L | 0 4 H |
| 15 | 49mm | | L L H H L | 0 6 H |
| 16 | 46mm | | L L H H H | 0 7 H |
| 17 | 43mm | | L H H H H | 0 F H |
| 18 | 41mm | | L H H H L | 0 E H |
| 19 | 38mm(WIDE END) | | L H H L L | 0 C H |
| 20 | DURING RETRACTING | | L H H L H | 0 D H |
| 21 | RETRACTED | | L H L L H | 0 9 H |

Encoder columns: S10 S9 S8 S7 S6 GND

←NORMAL MODE

←AUTO ZOOM MODE

←SELF MODE

155 SELF MODE DISPLAY SEGMENT
151 AUTO ZOOM MODE DISPLAY SEGMENT
153 FILM COUNTER
152 FILM PRESENCE CONFIRMATION DISPLAY SEGMENT
154 FILM LOADING CONFIRMATION DISPLAY SEGMENT

FIG.16

| DISTANCE TO OBJECT (m) | DISTANCE DATA (ZONE No) |
|---|---|
| ~ 8.5 | 1 |
| 8.5 ~ 5.6 | 2 |
| 5.6 ~ 4.2 | 3 |
| 4.2 ~ 3.3 | 4 |
| 3.3 ~ 2.8 | 5 |
| 2.8 ~ 2.4 | 6 |
| 2.4 ~ 2.1 | 7 |
| 2.1 ~ 1.9 | 8 |
| 1.9 ~ 1.7 | 9 |
| 1.7 ~ 1.54 | 10 |
| 1.54 ~ 1.42 | 11 |
| 1.42 ~ 1.32 | 12 |
| 1.32 ~ 1.23 | 13 |
| 1.23 ~ 1.15 | 14 |
| 1.15 ~ 1.08 | 15 |
| 1.08 ~ 1.03 | 16 |
| 1.03 ~ 0.972 | 17 |
| 0.972 ~ 0.925 | 18 |
| 0.925 ~ 0.884 | 19 |
| 0.884 ~ 0.846 | 20 |
| 0.846 ~ 0.812 | 21 |
| 0.812 ~ 0.781 | 22 |
| 0.781 ~ 0.753 | 23 |
| 0.753 ~ 0.734 | 24 |
| 0.734 ~ 0.700 | 25 |

FIG.18

TABLE (1)

| DISTANCE DATA (ZONE No) | PARAMETER D |
|---|---|
| 1 | 11715 |
| 2 | 6622 |
| 3 | 4726 |
| 4 | 3683 |
| 5 | 3023 |
| 6 | 2567 |
| 7 | 2233 |
| 8 | 1978 |
| 9 | 1776 |
| 10 | 1614 |
| 11 | 1479 |
| 12 | 1367 |
| 13 | 1271 |
| 14 | 1189 |
| 15 | 1118 |
| 16 | 1055 |
| 17 | 999 |
| 18 | 950 |
| 19 | 906 |
| 20 | 866 |
| 21 | 830 |
| 22 | 797 |
| 23 | 767 |
| 24 | 740 |
| 25 | 715 |

$f = \beta \cdot D$ ($\beta$ = MAGNIFICATION)

TABLE (2)

| RESULT OF CALCULATION f | STOP POSITION |
|---|---|
| ~38 | 19 |
| ~41 | 18 |
| ~43 | 17 |
| ~46 | 16 |
| ~49 | 15 |
| ~52 | 14 |
| ~55 | 13 |
| ~58 | 12 |
| ~61 | 11 |
| ~64 | 10 |
| ~67 | 9 |
| ~70 | 8 |
| ~73 | 7 |
| ~76 | 6 |
| ~79 | 5 |
| ~82 | 4 |
| ~85 | 3 |
| ~88 | 2 |
| 89~ | 1 |

FIG.20

TABLE (3)

| ZOOM POSITION | OPEN F No (AVo) |
|---|---|
| 1 | 5.875 |
| 2 | 5.875 |
| 3 | 5.875 |
| 4 | 5.750 |
| 5 | 5.625 |
| 6 | 5.500 |
| 7 | 5.375 |
| 8 | 5.250 |
| 9 | 5.125 |
| 10 | 5.000 |
| 11 | 4.875 |
| 12 | 4.750 |
| 13 | 4.500 |
| 14 | 4.375 |
| 15 | 4.125 |
| 16 | 3.875 |
| 17 | 3.750 |
| 18 | 3.625 |
| 19 | 3.625 |

| ISO SENSITIVITY (Sv) | ISO CODE | | |
|---|---|---|---|
| | Dx3 | Dx2 | Dx1 |
| 25 (3) | 1 | 1 | 1 |
| 50 (4) | 1 | 1 | 0 |
| 100 (5) | 1 | 0 | 1 |
| 200 (6) | 1 | 0 | 0 |
| 400 (7) | 0 | 1 | 1 |
| 800 (8) | 0 | 1 | 0 |
| 1600 (9) | 0 | 0 | 1 |
| 3200 (10) | 0 | 0 | 0 |

FIG.29

TABLE (4)

| ADDRESS | ZOOM POSITION DATA | ADDRESS | ZOOM POSITION DATA |
|---|---|---|---|
| 0 0 | $(11)_{10}$ | 1 0 | $(6)_{10}$ |
| 0 1 | $(12)_{10}$ | 1 1 | $(5)_{10}$ |
| 0 2 | $(10)_{10}$ | 1 2 | $(7)_{10}$ |
| 0 3 | $(9)_{10}$ | 1 3 | $(8)_{10}$ |
| 0 4 | $(14)_{10}$ | 1 3 | $(3)_{10}$ |
| 0 5 | $(13)_{10}$ | 1 5 | $(4)_{10}$ |
| 0 6 | $(15)_{10}$ | 1 6 | $(2)_{10}$ |
| 0 7 | $(16)_{10}$ | 1 7 | $(1)_{10}$ |
| 0 8 | $(0)_{10}$ | 1 7 | $(0)_{10}$ |
| 0 9 | $(21)_{10}$ | 1 9 | $(0)_{10}$ |
| 0 A | $(0)_{10}$ | 1 A | $(0)_{10}$ |
| 0 B | $(0)_{10}$ | 1 B | $(0)_{10}$ |
| 0 C | $(19)_{10}$ | 1 C | $(0)_{10}$ |
| 0 D | $(20)_{10}$ | 1 D | $(0)_{10}$ |
| 0 E | $(18)_{10}$ | 1 E | $(0)_{10}$ |
| 0 F | $(17)_{10}$ | 1 F | $(0)_{10}$ |

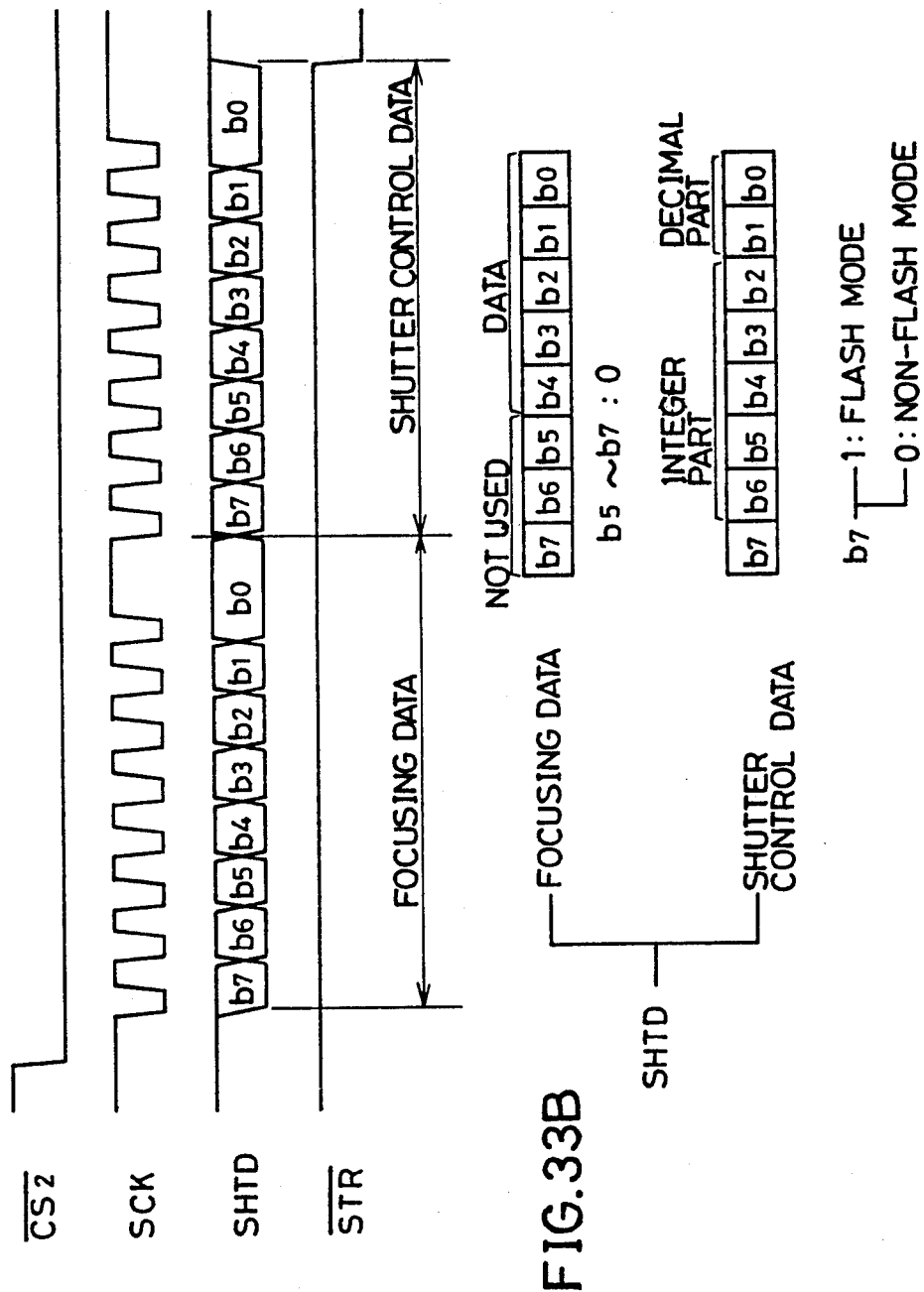

| EVC | To (ms) | EVC | To (ms) |
|---|---|---|---|
| 6 | 128.5 | 12 | 13.45 |
| 7 | 72.5 | 13 | 11.9 |
| 8 | 42.4 | 14 | 9.80 |
| 9 | 26.7 | 15 | 7.52 |
| 10 | 20 | 16 | 5.48 |
| 11 | 15.8 | 17 | 4.11 |

CAMERA HAVING AN AUTO ZOOM FUNCTION

BACKGROUND OF THE INVENTION

1. Field of the Invention

The present invention relates to a camera having an automatic magnification adjusting (hereinafter referred to as auto zoom) function and particularly to a camera having an auto zoom function which enables control of auto zoom operation at the will of a photographer.

2. Description of the Related Art.

A camera with an auto zoom function of interest to the present invention is described for example in Japanese Patent Laying-Open No. 63-220118.

According to Japanese Patent Laying-Open No. 63-220118, when a ratio of an object size to an image frame (corresponding to a photographing magnification) is preset to a predetermined value, the camera automatically adjusts a focal length and sets a ratio of the object occupied in the image frame to the above mentioned value. In consequence, the user can take a picture in which the ratio of the desired object to the image frame is set to the predetermined value, only by tracking the object without taking notice of zoom operation.

The conventional camera having the auto zoom function is thus constructed. In such a camera, auto zoom operation is started by turn-on of a light measurement switch for light measurement of an object (in most cases, by half depression of a release switch) and even if the light measurement switch is turned off after the start of the auto zoom operation, the zooming continues to a desired zoom position (focal length) in the auto zoom operation. Accordingly, if the user loses interest in the object during tracking the object and turns off the light measurement switch, the zooming still continues. As a result, the timing of the user's operation (the on/off operation of the light measurement switch) and the timing of the operation of the camera (the auto zoom operation) do not agree with each other and the user has a feeling of disagreement in the operation of the camera. In addition, since the camera does not react faithfully to the will of the user, it cannot rapidly proceed to the subsequent operation required by the user and thus it has an inferior responsitivity.

If a tele converter is attached to the lens, a desired auto zoom effect cannot be obtained in auto zoom operation.

If auto zoom operation is to be carried out by using all of measured distance data, it would be sometimes difficult to carry out the auto zoom operation smoothly.

In addition, the conventional camera having the auto zoom function is capable of changing a magnification and it uses a magnification setting method in which selecting means determines a suitable magnification from several magnifications prepared in advance. Accordingly, the camera has a very low degree of freedom in selection of a photographing magnification and it is impossible to change the photographing magnification in auto zoom operation to an arbitrary value.

The auto zoom function is a function of adjusting automatically a focal length f of a taking lens to $f = \beta \times D$ so that a photographing magnification set to $\beta$ is obtained with respect to a given distance D to an object. For example, if a picture is to be taken with the camera in a horizontal position, the magnification data is generally selected as described below. It is set to 1/70 in the case of a full-length picture; it is set to $\beta = 1/35$ in the case of an upper-half body picture; and it is set to $\beta = 1/15$ in the case of a face picture.

SUMMARY OF THE INVENTION

Therefore, an object of the present invention is to operate a camera having an auto zoom function at the will of a photographer.

Another object of the present invention is to improve responsitivity in a camera having an auto zoom function.

A further object of the present invention is to constantly obtain a desired auto zoom effect in a camera having an auto zoom function.

A further object of the present invention is to carry out auto zoom operation smoothly in a camera having an auto zoom function.

A still further object of the present invention is to make it possible to change a photographing magnification necessary for calculation of a focal length in auto zoom operation to an arbitrary value in a camera having an auto zoom function.

The above described objects of the present invention can be accomplished as described below. A camera according to the present invention includes: a taking lens including a plurality of lens elements for zooming operation; an operable member; a distance measurement device for detecting a distance to an object in response to operation of the operable member; a focal length determining device for determining a prescribed focal length corresponding to a desired photographing range, according to the detected distance; a drive device for driving at least a part of the lens elements to set the determined focal length; a detector for detecting operation or non-operation of the operable member; and a controller for stopping the drive of the drive device when the detector detects non-operation of the operable member during the drive, even if a present focal length of the taking lens does not attain the prescribed focal length.

The taking lens is driven by the drive device to enable auto zoom operation so that the taking lens set a focal length determined by the focal length determining device based on the measured distance data obtained by the distance measuring device.

According to the present invention, the control device stops movement of the taking lens even if the position of the lens does not reach the prescribed focal length, when the non-operation of the operable member is detected. As a result, the camera having the auto zoom function can be operated at the will of the photographer.

According to another aspect of the present invention, a camera includes: a taking lens including a plurality of lens elements for zooming; a distance measuring device for detecting a distance to an object; a focal length determining device for determining a prescribed focal length corresponding to a desired photographing range, according to the detected distance; a drive device for driving at least a part of the lens elements to set the determined focal length; the camera being operated in a first mode for driving the taking lens to set the determined focal length and in a second mode for forbidding the above mentioned drive; a converter for changing a focal length of the taking lens; a converter attachment detector for detecting an attachment of the converter to the lens; and a controller for setting the second mode in the camera when the detector detects the attachment of the converter.

Since the camera according to the present invention includes the above described elements, when the converter attachment detector detects the attachment of the converter, the position of the taking lens does not move to attain the focal length determined by the determining device. Thus, only when the converter, which is liable to cause trouble, is not attached, the auto zoom function is operated and accordingly a desired auto zoom effect can be constantly obtained in the camera having the auto zoom function.

According to a further aspect of the present invention, a camera includes: a distance measuring device for detecting a distance to an object; a field angle determining device for determining a field angle according to the distance to the object; an operable member; a change device for changing the field angle in response to operation of the operable member; and a controller for controlling the field angle determining device to cause a field angle changed by the change device to be equal to the field angle determined by the field angle determining device.

Since the camera according to the present invention includes the above described elements, the field angle determined according to the distance to the object is changed to a desired field angle by using the operable member. As a result, the photographing magnification set by auto zoom operation can be changed by simple operation.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram for explaining a zoom encoder.

FIG. 9 is a flow chart of a routine with a light measurement switch S1 on.

FIG. 10 is a flow chart of a routine with an auto zoom mode switch S3 on.

FIG. 11 is a flow chart showing a routine with a self switch on.

FIG. 12 is a flow chart showing a routine with a zoom switch on.

FIG. 16 is a diagram showing a relation between a distance to an object and measured distance data.

FIG. 18 is a diagram showing details of AZ calculation.

FIG. 20 is a table (3) showing a relation between a zoom position and an open F value.

FIG. 29 shows a reference table (4) for zoom position reading.

FIGS. 33A and 33B are diagrams showing timing of data transmission to a shutter block in release operation.

DESCRIPTION OF THE PREFERRED EMBODIMENTS

(1) First Embodiment

Figure 1:
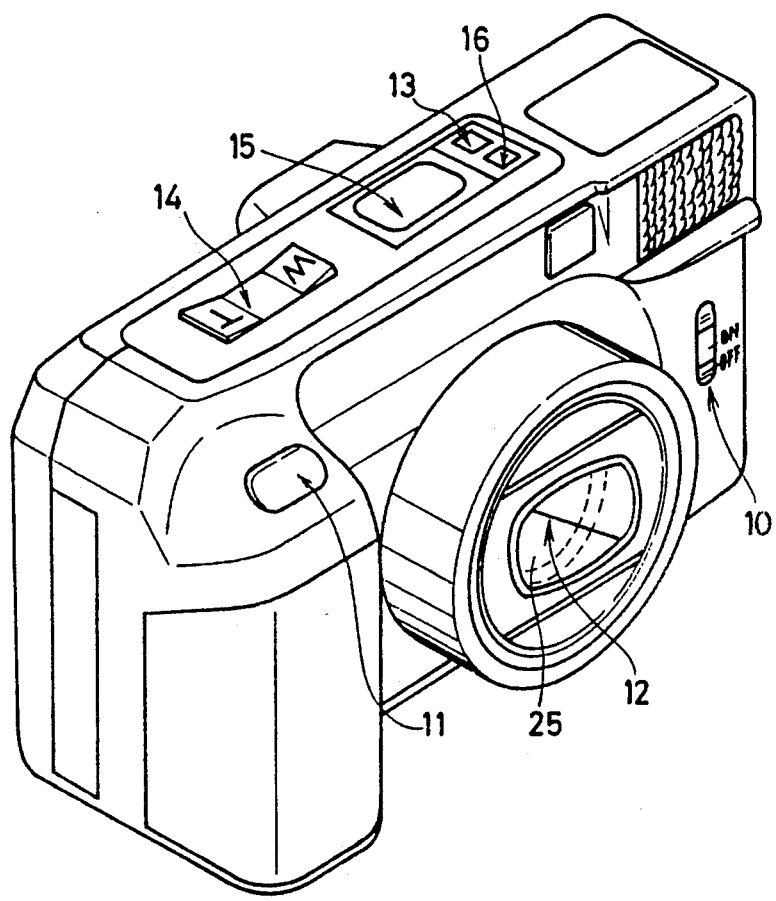
FIG. 1 is an appearance view of a camera body to which the present invention is applied.

Referring to FIG. 1, a camera having an auto zoom (AZ) mechanism according to the present invention comprises: a main switch operation lever 10 provided on the front surface of the camera body for enabling operation of the camera; a release button 11 provided in an upper portion of the camera body for enabling light measurement and exposure; a taking lens 12 provided on the front surface of the camera body for photographing an object; an auto zoom mode button 13 provided in an upper portion of the camera body for setting an auto zoom mode; a zoom operation lever 14 which is a seesaw switch, provided in an upper portion of the camera body for switching the focal length of the taking lens 12 between a tele direction (i.e., the direction in which the focal length increases) and a wide direction (i.e., the direction in which the focal length decreases); a liquid crystal display LCD 15 provided in the upper portion of the camera body for displaying an aperture value, a shutter speed and so on; and a self mode button 16 for photographing the object in a self mode.

The release button 11 is of a two-stroke type. At the first stroke (in a half depression), a light measurement switch S1 is turned on to start measurement of light and, at the second stroke (in full depression), a release switch S2 is turned on to start exposure. The zoom operation lever 14 includes a zoom-in switch S4 for moving the taking lens in the tele direction, and a zoom-out switch S5 for moving the taking lens 12 in the wide direction. The focal length of the taking lens 12 is in the range of 38 to 90 mm.

Figure 2:
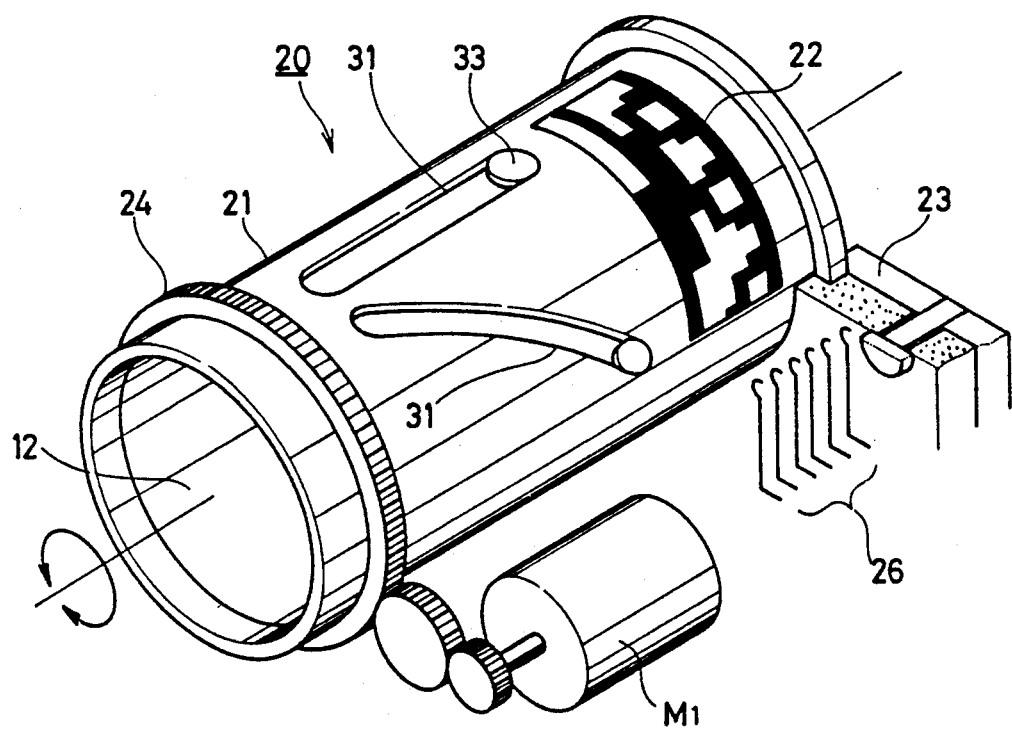
FIG. 2 is a perspective view showing a lens barrel unit of a taking lens of a camera to which the present invention is applied.

Referring to FIG. 2, a lens barrel unit 20 comprises: a lens barrel (cam ring) 21; a zoom motor M1 provided near the lens-side end of the lens barrel 21 for moving the taking lens 12 in the tele direction or the wide direction by rotating the lens barrel 21; a zoom encoder 22 for detecting a zoom position (i.e., the focal length) defined by the rotation of the lens barrel 21; an encoder brush 26 for obtaining output signals S6 to S10 from the zoom encoder 22; and a holding member 23 for holding the lens barrel 21 on the camera body. A lens barrel rotation gear 24 for transmitting the drive force of the zoom motor M1 to the lens barrel 21 is provided around the lens barrel 21. The zoom motor M1 is driven by operation of the zoom operation lever 14 shown in FIG. 1 and the drive force is transmitted to the lens barrel 21 through the lens barrel rotation gear 24, whereby the focal length of the taking lens 12 is changed. The focal length at the lens stop position is detected by the zoom encoder 22 and the focal length is transmitted as an encoder signal through the encoder brush 26 to a control central processing unit (CPU) 1 provided in the camera body. This will be described later in detail.

FIG. 3 is a diagram showing relations between the output signals of the zoom encoder 22 and the focal lengths of the taking lens 12 described in connection with FIG. 2. Referring to FIG. 3, the zoom encoder 22 is a gray code type encoder and it has an encoder pattern as shown in the center of the figure. The zoom encoder has 21 zoom positions represented as 1 to 21 and a typical focal length for each zoom position is represented as a typical f value. For example, the typical f value with the zoom position 1 is 90 mm and the taking lens 12 in this case is at the tele end. On the other hand, the typical f value with the zoom position 19 is 38 mm and the taking lens 12 in this case is at the wide end. The zoom positions 20 and 21 are the positions in which the taking lens 12 is in a retracted state. The encoder pattern is as shown in the center of the figure and the output signals S6 to S10 as shown are outputted as encoder signals from the encoder brush 26. The contents of the signals are shown in the column of "function" in which on and off states of the encoder pattern are represented as H and L, respectively. The contents of the functions are represented as hexadecimal codes. More specifically, if the zoom position is defined, the typical f value is defined accordingly and the output data in that case is provided as a hexadecimal code in five bits.

Figure 4:
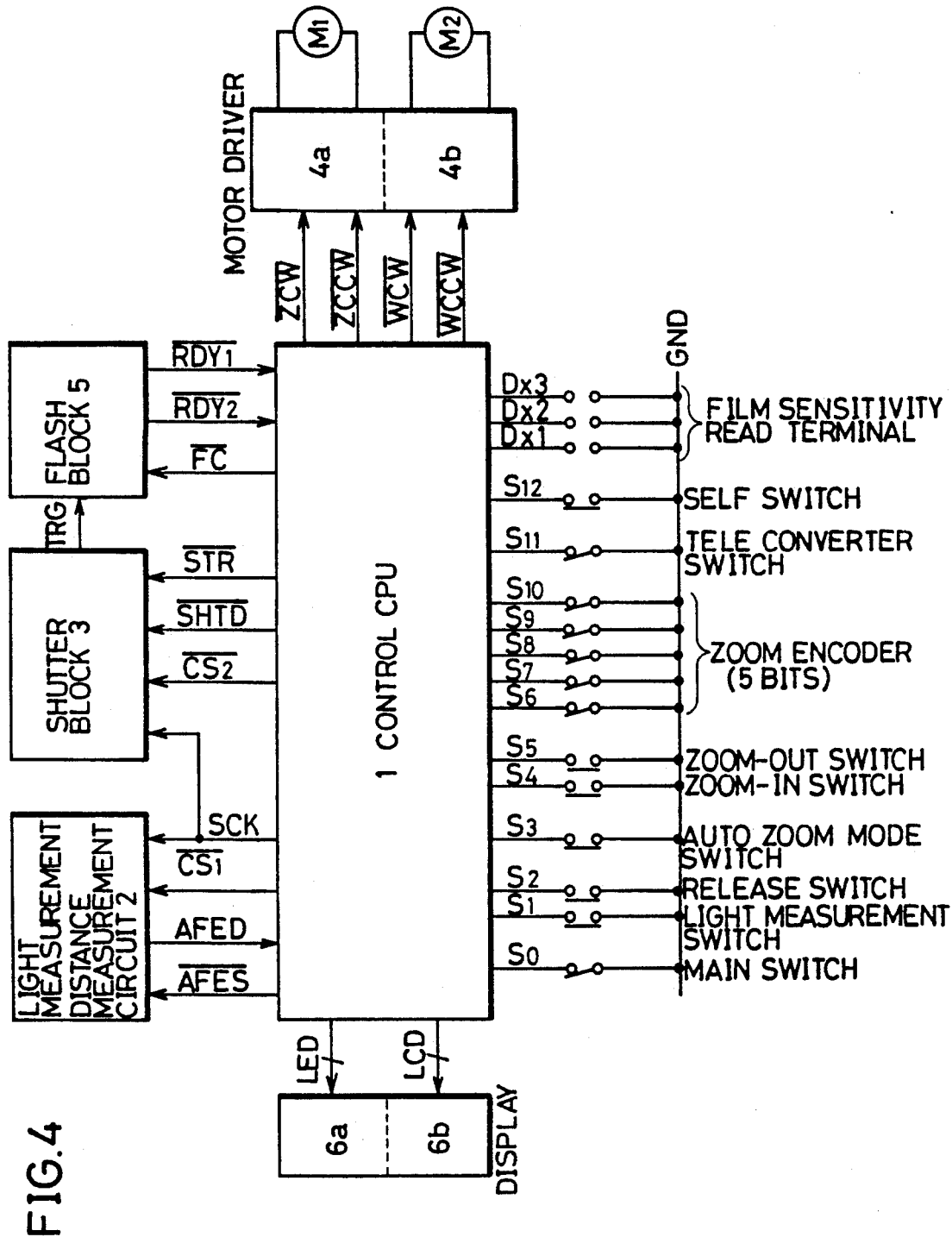
FIG. 4 is an electric circuit diagram of a camera capable of performing auto zooming according to the present invention.

Referring to FIG. 4, an electric circuit of the camera having an auto zoom mode according to the present invention comprises the control CPU 1 which receives the output signals from the switches in the camera body such as the main switch S0 or from the zoom encoder shown in FIG. 2, and the output signals from film sensitivity reading terminals (DX1, DX3) described afterwards and controls the entire system of the camera in response to those output signals. The control CPU 1 is connected with a light measurement•distance measurement circuit 2 responsive to a clock signal SCK for serial communication, and a flash block 5 which outputs monitor signals $\overline{RDY1}$, $\overline{RDY2}$ in response to a flash boosting start signal $\overline{FC}$ from the control CPU 1. The control CPU 1 is further connected with: a motor driver portion 4 which controls the operation of the zoom motor M1 and the winding/rewinding motor M2 in response to the output signals; and a display portion 6 which displays prescribed data on the liquid crystal display LCD 15 in response to the output signals LED, LCD from the CPU 1. The light measurement•distance measurement circuit 2 receives a data destination designating signal $\overline{CS1}$ from the control CPU 1 and a light measurement•distance measurement circuit turn-on signal $\overline{AFES}$ for turning on the light measurement•distance measurement circuit and outputs a light measurement•distance measurement circuit data read signal $\overline{AFED}$ to the control CPU 1. A shutter block 3 receives a data destination designating signal $\overline{CS2}$, focus data, a shutter control data output signal $\overline{SHTD}$ and a focusing start instruction signal $\overline{STR}$ from the control CPU 1. The motor driver portion 4 comprises a zoom motor driver 4a for controlling the zoom motor M1, and a winding/rewinding moor driver 4b for controlling the winding/rewinding motor M2. The zoom motor driver 4a receives zoom motor M1 drive signals $\overline{ZCW}$, $\overline{ZCCW}$ from the control CPU 1, while the winding/rewinding motor driver 4b receives film winding motor control signals $\overline{WCW}$, $\overline{WCCW}$ from the control CPU 1. The display portion 6 receives a light emitting diode display signal LED and a liquid crystal display signal LCD and displays the contents of those signals.

Table 1 shows values of the control signals $\overline{ZCW}$, $\overline{ZCCW}$ of the zoom motor M1 and the states of the motor with those values. Table 2 shows values of the control signals $\overline{WCW}$, $\overline{WCCW}$ of the winding/rewinding motor M2 and the states of the motor with those signals.

TABLE 1

| 4a | $\overline{ZCW}$ | $\overline{ZCCW}$ | State of motor |
|---|---|---|---|
| Zoom | H | L | OFF |
| motor | L | H | regular rotation (zoom-in) |
| M1 | H | L | reverse rotation (zoom-out) |
| | L | L | brake |

TABLE 2

| 4b | $\overline{WCW}$ | $\overline{WCCW}$ | State of motor |
|---|---|---|---|
| Wind/ | H | H | OFF |
| rewind | L | H | regular rotation (winding) |
| motor | H | L | reverse rotation (rewinding) |
| M2 | L | L | brake |

Figure 5A:
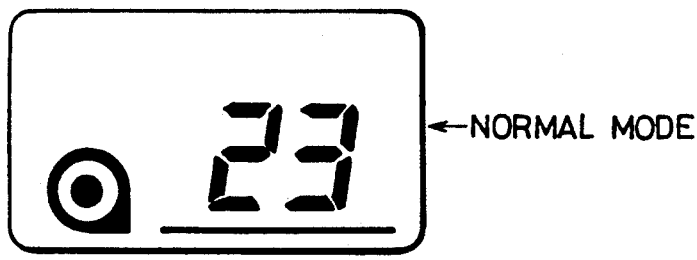
FIGS. 5A-5D shows display segments of a liquid crystal display LCD.
Figure 5B:
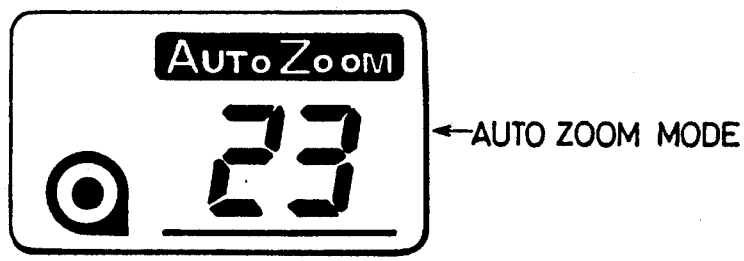
Figure 5C:
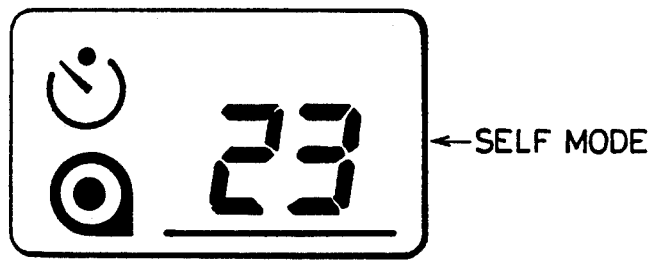
Figure 5D:
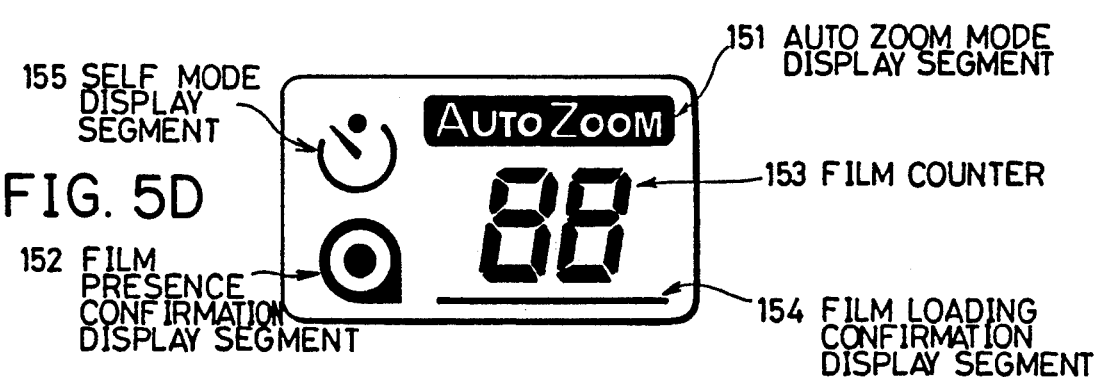

Referring to FIG. 5A-5D the contents displayed on the liquid crystal display LCD will be described. When the camera is in the normal mode as described below, the content as shown in FIG. 5A is displayed. In the auto zoom mode, the content as shown in FIG. 5B is displayed. In a self mode as described below, the content as shown in FIG. 5C is displayed. Display segments necessary for displaying such contents are shown in FIG. 5D. Referring to FIG. 5D, the liquid crystal display LCD includes an auto zoom mode display segment 151, a film presence confirmation display segment 152, a film counter 153, a film loading confirmation display segment 154, and a self mode display segment 155.

Figure 6:
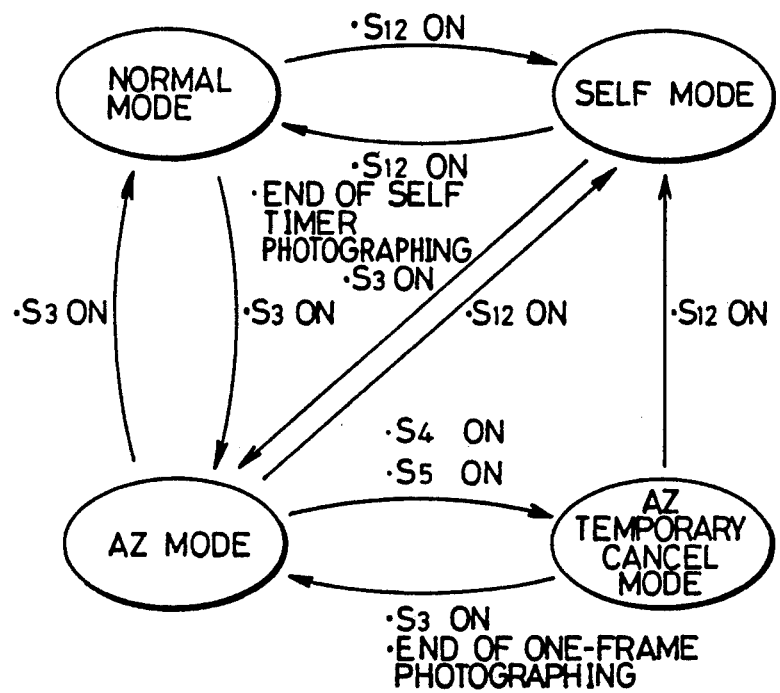
FIG. 6 is a diagram showing switching of photographing modes in a camera capable of performing auto zooming according to the present invention.

The camera having the automatic zooming function according to the present invention has the normal mode, the auto zoom mode, the self mode and an auto zoom temporary cancel mode as described in connection with FIG. 5. The relation of switching among those modes is shown in FIG. 6. The normal mode is a mode in which selftimer-photographing is not effected and it is an initial mode when the camera starts to be operated. The self mode is a mode in which selftimer-photographing is carried out. This mode is selected in the case of taking a picture of gathered people and so on. In this mode, exposure is carried out after an elapse of predetermined time from the depression of the release button 11. The auto zoom mode (AZ mode) is a mode in which the focal length f of the taking lens 12 is automatically regulated in order to take a photograph with a predetermined magnification. The AZ temporary cancel mode is a mode in which the AZ mode is temporary canceled.

Referring to FIG. 6, switching among the above described four modes will be described. In order to switch from the normal mode at the start of operation of the camera to the AZ mode, it is necessary to depress the auto zoom mode button 13 shown in FIG. 2. In order to return from the AZ mode to the normal mode, it is also necessary to depress the auto zoom mode button 13. In other words, each time the auto zoom mode button 13 is depressed, switching between the normal mode and the AZ mode occurs. In order to switch from the normal mode to the self mode, it is necessary to depress the self mode button 16 shown in FIG. 2. In order to return from the self mode to the normal mode, it is only necessary to depress the self mode button 16 in the same manner (after an end of selftimer-photographing, automatic return to the normal mode occurs). Thus, each time the self mode button 16 is depressed, switching between the normal mode and the self mode occurs. In order to switch from the AZ mode to the AZ temporary cancel mode, it is only necessary to depress the zoom-in switch S4 or the zoom-out switch S5 by using the zoom operation lever 14 shown in FIG. 1. Conversely, in order to return from the AZ temporary cancel mode to the AZ mode, it is necessary to turn on the auto zoom mode switch S3 by depressing the auto zoom mode button 13 shown in FIG. 1 or to terminate photographing for one frame. In order to switch from the AZ temporary cancel mode to the self mode, it is only necessary to turn on the self switch S12 by depressing the self mode button 16. In order to switch between the AZ mode and the self mode, it is only necessary to turn on the auto zoom mode switch S3 or the self mode switch S12.

Figure 7:
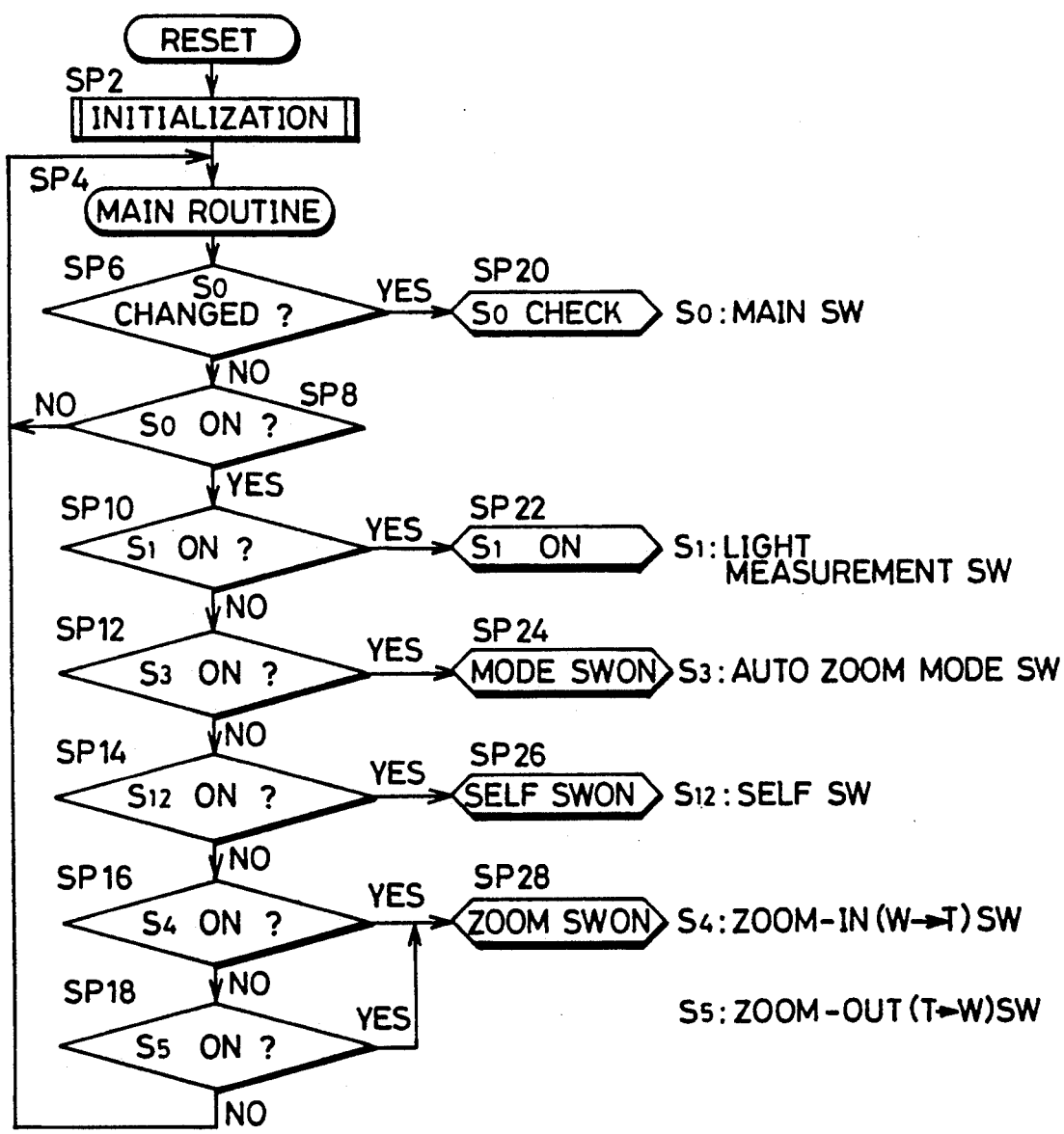
FIG. 7 is a flow chart showing a main routine of a camera capable of performing auto zooming according to a first embodiment of the present invention.

FIG. 7 is a flow chart of a main routine showing the operation in the camera shown in FIG. 1. The camera having the auto zoom mode according to this embodiment starts the operation when the camera body is in a reset state after turn-on of the battery. Referring to FIG. 7, when the camera is reset, the processing flow enters an initialization subroutine (step SP2) for initializing various parameters, flags and memories to operate the camera. Then, the main routine (step SP4) starts and it is determined whether the state of the main switch S0 is changed or not (in step SP6). If it is determined that the state of the main switch S0 is changed, the flow proceeds to a main switch check routine (in step SP20) for checking the state of the main switch S0. If it is determined in step SP6 that the state of the main switch S0 is not changed, it is determined whether the main switch S0 is on or not (in step SP8). If it is determined that the main switch S0 is on, it is determined whether the light measurement switch S1 is on or not (in step SP10). If it is determined that the switch S1 is on, the processing flow proceeds to a light measurement switch on routine (in step SP22). If the light measurement switch S1 is not on, it is determined whether the auto zoom mode switch S3 is on or not (in step SP12). If it is determined that the switch S3 is on, the processing flow proceeds to a mode switch on routine (in step SP24). If it is determined that the auto zoom mode switch S3 is off, it is determined whether the self switch S12 is on or not (in step SP14). If it is determined that the switch S12 is on, the processing flow proceeds to a self switch on routine (in step SP26). If it is determined that the switch S12 is off, it is determined whether the zoom-in switch S4 is on or not. If the zoom-in switch S4 is not on, it is determined whether the zoom-out switch S5 is on or not. If the zoom-in switch S4 is on or the zoom-out switch S5 is on, the processing flow proceeds to a zoom switch on routine (in step SP28). If it is determined in step SP8 that the main switch S0 is off or it is determined in step SP18 that the zoom-out switch S5 is off, the processing flow proceeds to the main routine (in step SP4).

Figure 8:
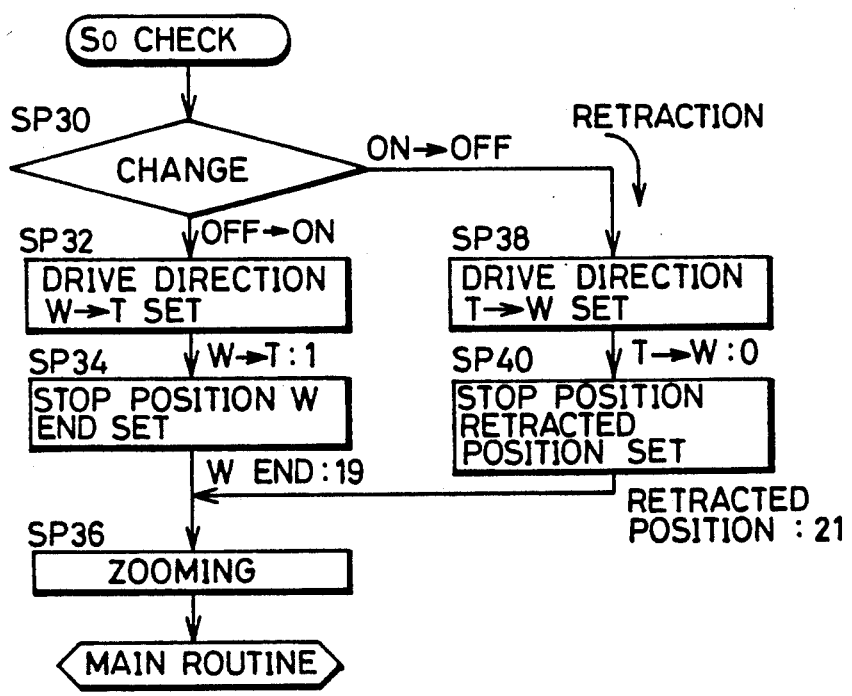
FIG. 8 is a flow chart of a main switch S0 check routine.

FIG. 8 is a flow chart showing the details of the main switch check routine in step SP20 of the main routine of FIG. 7. Referring to FIG. 8, when the main switch S0 check routine starts, it is first determined whether the change of the main switch S4 is from the off state to the on state or not (in step SP30). If the change is from the off state to the on state, the direction of drive of the taking lens 12 is set to the tele direction (in step SP32). Then, the stop position of the taking lens 12 is set at the wide end (the zoom position 19 shown in FIG. 3). On the other hand, if it is determined in step SP30 that the change of the main switch S0 is from the on state to the off state, retracting operation of the taking lens 12 is required and, consequently, the drive direction is set to the wide direction (in step SP38) and the stop position of the taking lens 12 is set to the retracted position (the zoom position 21 shown in FIG. 3) in step SP40). After the stop position is set in step SP34 or SP40, the processing flow proceeds to a zooming subroutine (in step SP36) and then returns to the main routine (in step SP4).

The drive direction set in step SP32 or SP38 is stored as data "1" or "0" in a RAM of the control CPU 1. More specifically, "1" is set if the drive direction is the tele direction, and "0" is set if it is the wide direction.

Next, the retracting operation of the taking lens 12 will be described. The retracted state of the taking lens 12 is a state in which the lens barrel 21 is contained in the camera body when the taking lens 12 is not used. When the taking lens 12 is in the retracted position represented as the zoom position 21 shown in FIG. 3, the taking lens 12 is covered with a barrier 25 as shown in FIG. 1. If the taking lens 12 is in process of being retracted as shown by the zoom position 20, a picture can not be taken because the barrier 25 is half-opened.

Next, the processing with the light measurement switch S3 being depressed will be described with reference to FIG. 9. When the light measurement switch S1 is turned on at the first stroke of the release button 11, the processing flow proceeds to a light measurement/distance measurement subroutine (in step SP50) and then it is determined whether the AZ mode is set or not (in step SP52). If it is determined that the AZ mode is set, it is determined whether a tele converter is attached to the zoom lens or not (in step SP531). If it is determined that the tele converter is attached thereto, the photographing mode changes from the AZ mode to the normal mode (in step SP532) and the processing flow proceeds to the mode display in step SP533. After that the processing flow proceeds to step SP62. If the tele converter is not attached to the zoom lens, the processing flow proceeds to step SP54. Then, an AZ calculation subroutine (in step SP54), an automatic exposure (AE) calculation subroutine (in step SP56), a flash boosting subroutine (in step SP58) and a zooming subroutine (in step SP60) are executed. The above mentioned AE calculation (in step SP56) is performed based on the zoom position defined by the result of calculation of the AZ calculation subroutine (in step SP54). If it is determined in step SP52 that the AZ mode is not set, an AE calculation (in step SP62) is performed without effecting the AZ calculation and flash boosting (in step SP64) is carried out. After the zooming subroutine (in step SP60) in the case of the AZ mode or after the flash boosting (in step SP64) if the AZ mode is not selected, it is determined whether the light measurement switch S1 is still on or not (in step SP66). If the light measurement switch S1 is on, it is determined whether the release switch S2 is on or not. If the release switch S2 is off, flash boosting is carried out again (in step SP70) and the processing flow proceeds to step SP66. If the release button S2 is on in step SP68, pre-zooming (in step SP72) (to be described afterwards) for fine zooming is carried out to ensure a sufficient resolution and after a focusing-/exposure subroutine (in step SP74) and winding for one frame (in step SP76), it is determined whether the AZ temporary cancel mode is set or not (in step SP78). If the AZ temporary cancel mode is not set, the processing flow returns to step SP66. If the AZ temporary cancel mode is set, the photographing mode changes from the AZ temporary cancel mode to the AZ mode (in step SP80) and the mode in that case is displayed on the liquid crystal display LCD 15. Then, the processing flow returns to the main routine. If the light measurement switch S1 is off in step SP66 and if the AZ temporary cancel mode is not set in step SP78, the processing flow proceeds to the main routine.

As to the mode display method in the display LCD 15, the auto zoom mode display segment 151 (in FIG. 5D) is turned on if the AZ mode is set and, if the AZ temporary cancel mode is set, the auto zoom mode display segment 151 blinks with a frequency of 2 Hz.

The AZ temporary cancel mode is used in cases as described below. For example, if the AZ mode is set, the size of an object (the photographing magnification) is defined by the camera. However, it may happen that the photographer does not like the size thus defined. In such a case, if the zoom operation lever 14 is operated, the AZ temporary cancel mode is set and it is possible to change the size of the object by using the lever in the same manner as in normal zooming.

Figure 10:
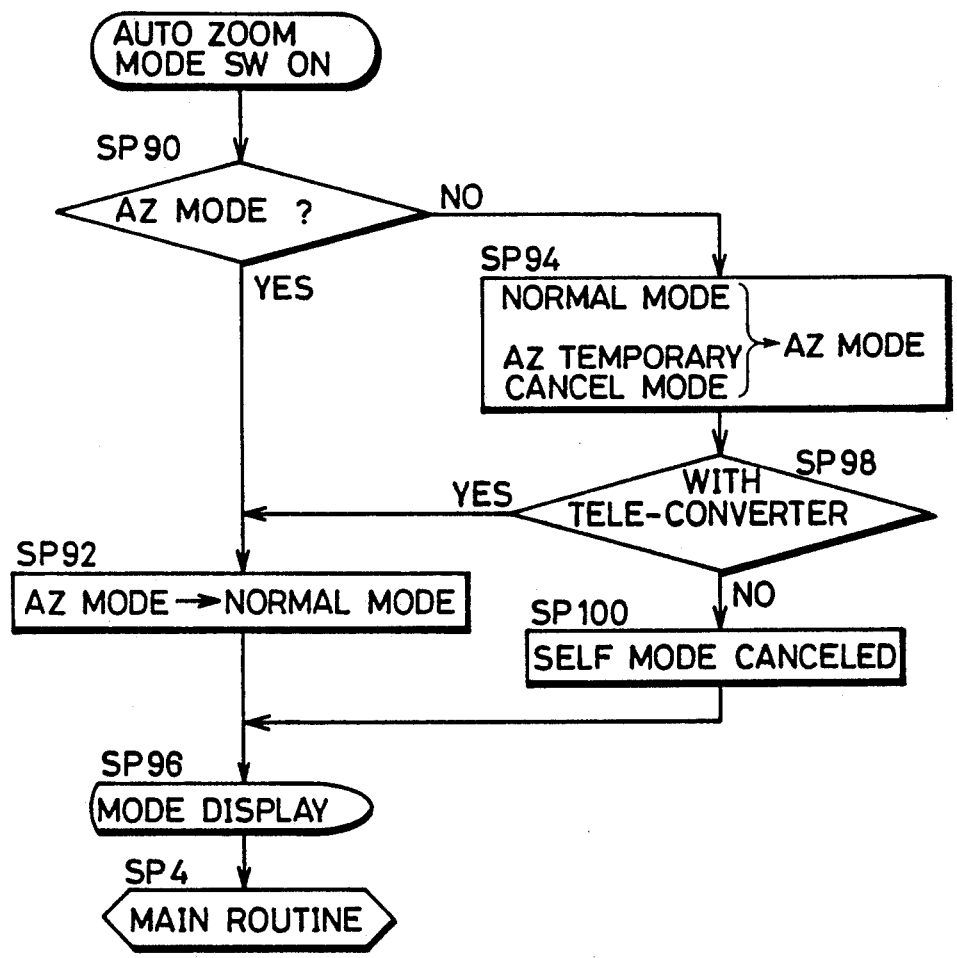

FIG. 10 is a subroutine with the auto zoom mode switch S3 being on. Referring to FIG. 10, when the auto zoom mode switch S3 is turned on, it is determined whether the AZ mode is set or not (in step SP90). If it is determined that the AZ mode is set, the photographing mode changes from the AZ mode to the normal mode (in step SP92). If it is determined in step SP90 that the AZ mode is not set, the photographing mode changes to the AZ mode (in step SP94) if it has been the normal mode or the AZ temporary cancel mode. Then, it is determined whether a tele converter is attached to the zoom lens or not (in step SP98). If it is determined that the tele-converter is attached thereto, the processing flow proceeds to step SP92. If the tele-converter is not attached thereto, the self mode is canceled irrespective of whether the self mode is set or not (in step SP100) and the processing flow proceeds to the mode display in step SP96, so that the photographing mode set in that case is displayed as shown in FIG. 6.

The determination in step SP98 as to whether the tele converter is attached or not is made dependent on the on or off state of the tele converter switch S11 which is changed in response to attaching or detaching the tele converter and which is disposed near the taking lens 12. The reasons for the switching from the AZ mode to the normal mode in the case of the determination in step SP98 that the tele converter is attached are as follows. First, when the tele converter is attached to the lens 12, focal length of the lens 12 which can be used is restricted in the range of 70 to 90 mm in the present embodiment. Therefore, a rate of change of the magnification (i.e., a rate of change of the size of the object) is little so that the camera attached tele converter cannot achieve a sufficient auto zoom function. Further, in a camera where the lens cannot be exchanged, as in the present embodiment, a front converter is generally used and such a front converter is large and heavy. Consequently, if zooming is carried out with such condition, the load applied to the zoom motor M1 increases and the zooming speed becomes slow. Therefore, the time required for auto zoom is prolonged and the time lag, which is defined as a time period till the completion of the exposure after depression of the release button, is increased. As a result, it is not possible to take pictures with good timing.

Figure 11:
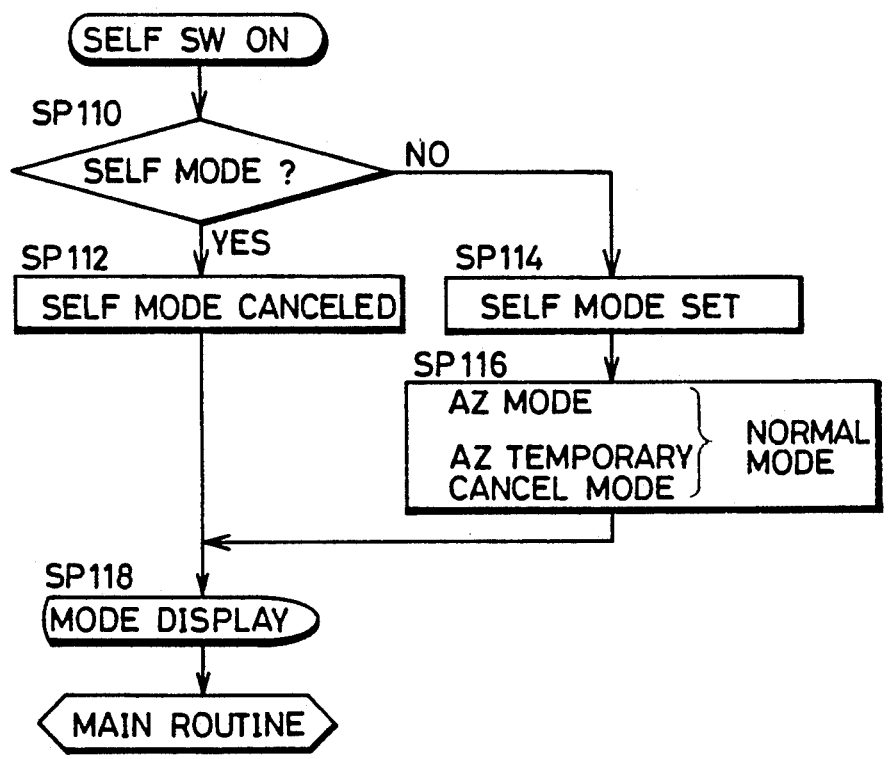

Next, referring to FIG. 11, the subroutine with the self switch S12 being on will be described.

If the self switch S12 is on, it is determined at first whether the self mode is set or not (in step SP110). If the self mode is set, the self mode is canceled (in step SP112). If the self mode is not set, the self mode is set (in step SP114) and the photographing mode changes from the AZ mode or the AZ temporary cancel mode to the normal mode (in step SP116). Then, the photographing mode thus set is displayed on the display LCD as shown in FIG. 5 (in step SP118). After that, the processing flow proceeds to the main routine. Thus, double setting of the self mode and the AZ mode or the AZ temporary cancel mode is not effected.

Figure 12:
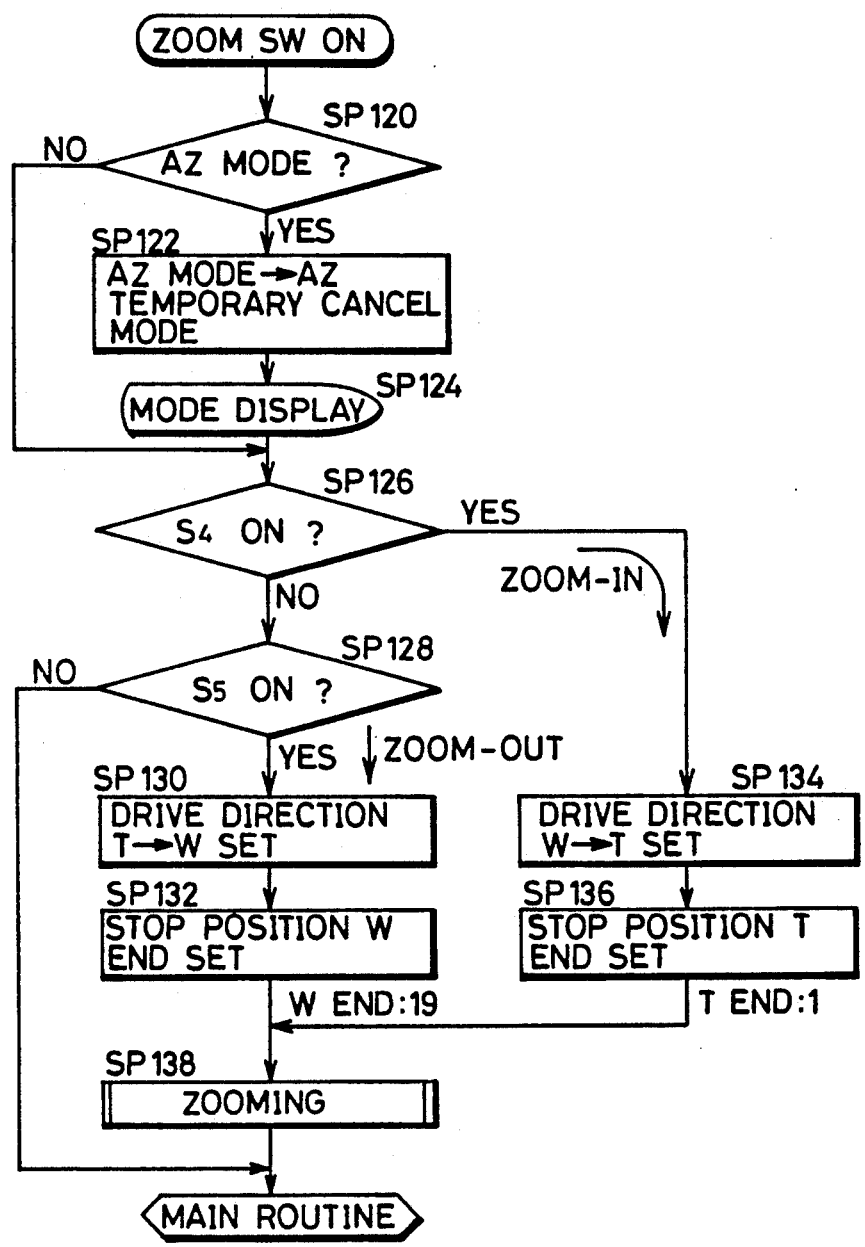

FIG. 12 shows a subroutine in which the zoom operation lever 14 shown in FIG. 1 is operated to turn on either the zoom-in switch S4 or the zoom-out switch S5. When either the zoom-in switch S4 or the zoom-out switch S5 is turned on, it is determined whether the photographing mode is the AZ mode or not (in step SP120). If it is the AZ mode, the photographing mode is switched from the AZ mode to the AZ temporary cancel mode (in step SP122) and the mode is displayed (in step SP124). If it is determined in step SP120 that the photographing mode is not the AZ mode or after the mode display is effected in step SP124, it is determined whether the zoom-in switch S4 is on or not. If the zoom-in switch S4 is on, the direction of drive of the taking lens 12 is set to the tele direction (in step SP134) and the stop position of the taking lens 12 is set to the tele end (in step SP136). If the zoom-in switch S4 is not on, it is determined whether the zoom-out switch S5 is on or not. If the zoom-out switch S5 is on, this means that zoom-out operation is instructed and accordingly the drive direction of the taking lens 12 is set to the wide direction (in step SP130) and the stop position of the taking lens 12 is set to the wide end (in step SP132). After the stop position of the taking lens 12 is set to either of the above mentioned ends, the processing flow proceeds to the zooming subroutine (in step SP138). If the zoom-out switch S5 is off in step SP128, or after zooming is terminated in step SP138, the processing flow returns to the main routine.

Even if both of the zoom-in switch S4 and the zoom-out switch S5 are off in steps SP126 and SP128, this subroutine occurs for example when an error signal such as noise is inputted. The set stop position of the taking lens 12 is stored in the RAM of the control CPU1 as zoom position data shown in FIG. 3 in the same manner as in steps SP34 and SP40 in FIG. 8.

Figure 13:
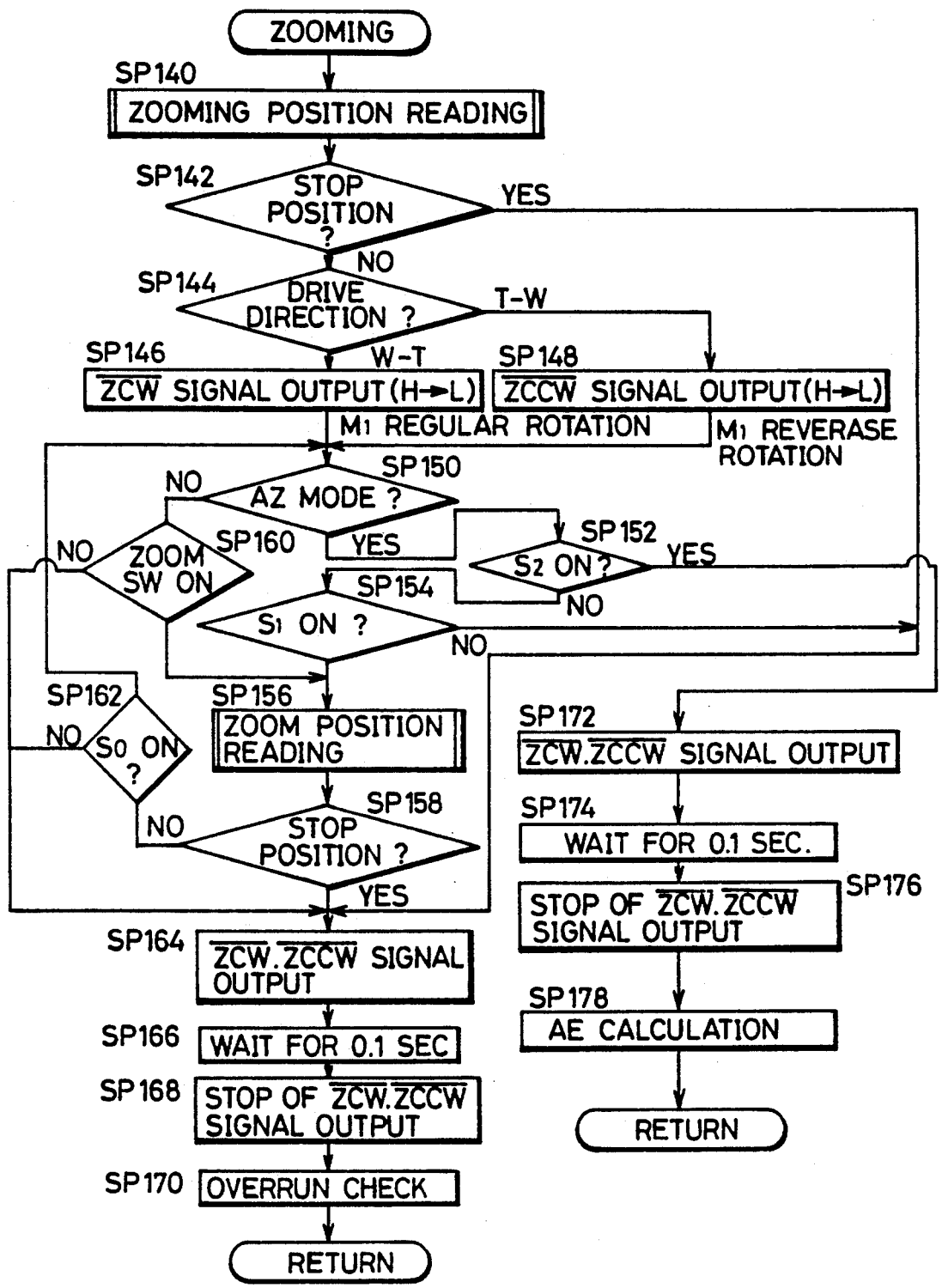
FIG. 13 is a flow chart showing a zooming subroutine.

Next, referring to FIG. 13, the zooming subroutine will be described. When the zooming subroutine is called, the zoom position is read at first (in step SP140) and it is determined whether the taking lens 12 reaches either stop position, i.e., the wide end or the AZ stop position, which is calculated at the AZ calculation in step SP54 in FIG. 9 (in step SP142). If it is determined that the taking lens 12 does not reach the stop position, a signal $\overline{ZCW}$ is outputted if the direction of drive of the taking lens 12 is the tele direction (in step SP146) and the zoom motor M1 is rotated in the regular direction. If the drive direction is the wide direction, the signal $\overline{ZCCW}$ is outputted (in step SP148) and the zoom motor M1 is rotated in the reverse direction, and it is determined whether the AZ mode is set or not (in step SP150). If it is determined in step SP150 that the AZ mode is set, it is determined whether the release switch S2 is on or not (in step SP152). If the release switch S2 is off, it is determined whether the light measurement switch S1 is on or not (in step SP154). If the light measurement switch S1 is on in step SP154, the zoom position is read (in step SP156) and it is determined whether the taking lens 12 reaches the stop position or not (in step SP158). If it is determined in step SP150 that the AZ mode is not set, it is determined whether the zoom-in switch S4 or the zoom-out switch S5 is on (in step SP160). If either switch is on, the processing flow proceeds to the zoom position read subroutine (in step SP156). If it is determined in step SP158 that the taking lens 12 is not at the stop position, it is determined whether the main switch S0 is on or not. If it is determined that the main switch S0 is on, the processing flow proceeds to step SP150.

If it is determined in step SP160 that the switches S4 and S5 are not on, or if it is determined in step SP162 that the main switch S0 is off, the processing flow proceeds to step SP164 to brake the zoom motor M1. If it is determined in step SP152 that the release switch S2 is on, the brake is applied to the zoom motor M1 (in step SP172) and there is a wait for 0.1 second (in step SP174). Then, the output of the brake signal to the zoom motor M1 is stopped (in step SP176) and AE calculation is performed (in step SP178). In this case, since the taking lens 12 is not moved to the initial desired position (AZ stop position) for photographing the object although the AZ mode is set, AE calculation is performed again at the zooming stop position. This is because the open F value of the taking lens 12 differs dependent on the zoom position.

If it is determined in step SP154 that the light measurement switch S1 is not on, the processing flow proceeds to step SP164 to apply the brake on the zoom motor M1. More specifically, referring to steps SP150, SP152, SP154 and SP164, if the light measurement switch S1 is turned off even during the zooming in the AZ mode, the brake is immediately applied on the zoom motor M1 and thus the start and stop of auto zoom operation can be controlled at the user's will. Consequently, it is possible to provide a camera having the auto zoom function in which no delay in timing occurs in photographing operation of the camera and the user can take photographs without feeling any disagreement.

The reason that the signals $\overline{ZCW}$, $\overline{ZCCW}$ are outputted to apply the brake on the zoom motor M1 in step SP164 is that both of the output signals are caused to be at L as shown in Table 1, thereby braking the motor.

When the brake is applied on the zoom motor M1, the brake continues for 0.1 second (in step SP166) and the drive of the zoom motor M1 is stopped (in step SP168). Then, the processing flow proceeds to an overrun check subroutine (in step SP170) to determine whether an overrun of the taking lens 12 occurs beyond a predetermined position.

Figure 14:
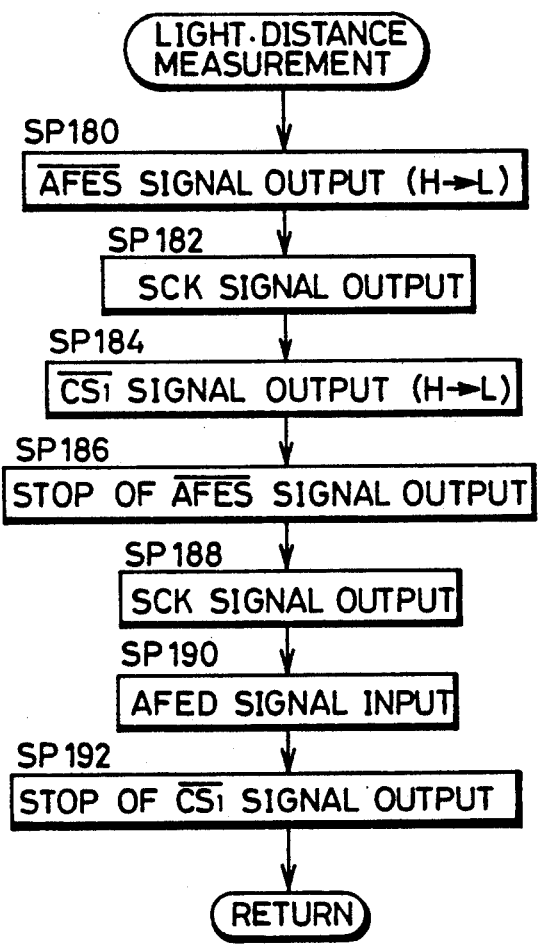
FIG. 14 is a flow chart showing light measurement•distance measurement subroutine.

Next, referring to FIG. 14, the light measurement•distance measurement subroutine will be described. In the light measurement•distance measurement subroutine, at first, a signal $\overline{AFES}$ is outputted to turn on the light measurement•distance measurement circuit (in step SP180). Then, a serial communication clock signal SCK is outputted as operation clock pulses for A/D conversion (in step SP182) and after output of predetermined clock pulses, a signal $\overline{CS1}$ for designating a data destination is outputted (in step SP184). The output of the signal $\overline{AFES}$ is stopped (in step SP186) to set light measurement•distance measurement data and the serial communication clock signal SCK is outputted (in step SP188). In synchronization, a signal $\overline{AFED}$ for reading the light measurement•distance measurement data is inputted (in step SP190) and after an end of reading of the light measurement•distance measurement data, the output of the signal $\overline{CS1}$ for turning off the light measurement•distance measurement circuit is stopped (in step SP192).

The timing of the signals in the above described light measurement and distance measurement operation, as well as the data related with this operation will be described with reference to FIG. 15A and 15B. First, referring to FIG. 15A, when the signal $\overline{AFES}$ goes to L, light measurement and distance measurement operation is started. In synchronization with the signal $\overline{AFES}$ at L, the signal SCK as the operation clock signal of the light measurement•distance measurement circuit generates 512 pulses for one cycle. During this period, the values obtained by light measurement and distance measurement are converted from the analog values to digital data. When the signal $\overline{CS1}$ goes to L, the signal $\overline{AFED}$ is outputted to the control CPU 1 in synchronization with the pulse signal SCK in the order of measured light data and measured distance data. Those data are transferred both as 8-bit serial data. A relation between the serial communication clock pulses SCK and the signal AFED outputted on that occasion in the case of outputting the measured light data is shown for example in an enlarged manner in the lower part in FIG. 15A. Referring to the illustration of the signal AFED, measured light data of one bit is transmitted for each cycle of the signal SCK. Details of the measured light data and the measured distance data are shown in FIG. 15B. Referring to FIG. 15B, the measured light data is data of eight bits in which more significant five bits represent an integer part and less significant three bits represent a decimal part. This data is a BV value which represents luminance of an object. The distance measurement data is data of eight bits in which only less significant five bits are used. This distance data indicates a distance to an object represented by a predetermined zone number. FIG. 16 shows a relation between the distance to the object and the zone number as the distance data.

Figure 17:
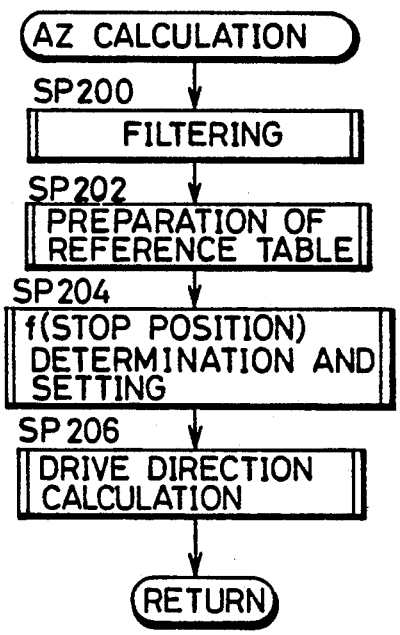
FIG. 17 is a flow chart of an AZ calculation subroutine.

FIG. 17 is a flow chart showing an AZ calculation subroutine. Referring to FIG. 17, when the processing flow proceeds to the AZ calculation subroutine, filtering is effected at first (in step SP200) and a reference table is prepared (in step SP202).

This filtering is effected for the below described purposes. If auto zoom operation is continuously performed, it happens that the main object comes outside an area of distance measurement. If the object is outside the area of distance measurement, a distance to the background is measured and a zoom state is set to a case in which the object is at the infinite distance, causing lack of smoothness in zooming operation. Particularly, in case of moving objects, such phenomenon will occur with high probability. Therefore, the distance data is filtered so as to nullify the distance data not related with the main object, whereby zooming operation can be carried out smoothly.

The method of filtering may include for example a method in which if the same data is obtained for a plural number of times, the data is rendered valid. More specifically, if discontinuous data exists among plural continuous data, such discontinuous data is rendered invalid. However, this case can not be applied to cases in which an object moves in the back-and-forth direction with respect to the camera. Another method may be considered in which the present distance data and is compared with the previous data and if the difference is more than a prescribed value, the present data is rendered invalid. According to the second method, even if an error of about ±1 zone exists in the distance data in the distance measurement circuit, such error can be absorbed.

Next, the reference table will be described. The reference table is used to refer to a zoom stop position in the AZ mode based on the distance to the object. An example of the reference table is shown in FIG. 18. Referring to FIG. 18, the reference table includes a table (1) and a table (2). The table (1) is used to refer to a prescribed parameter D based on the data representing prescribed distance data as the related zone number. The parameter D represents a real distance in mm. A focal length f is obtained by calculating a product of the parameter D, which corresponds to the filtered distance data (zone No.), and predetermined photographing magnification data $\beta$. The table (2) represents the stop position of the taking lens 12 in the AZ mode as the zoom position based on the focal length f obtained by the calculation. Tables (1) and (2) are both prepared in the RAM of the control CPU 1.

Returning to the AZ calculation routine in FIG. 17, the stop position corresponding to the calculated focal length f is defined and set (in step SP204) and the drive direction of the taking lens 12 is calculated (in step SP206). The calculation of the drive direction is effected by comparing the present stop position of the taking lens and the stop position corresponding to the obtained focal length f.

Figure 19:
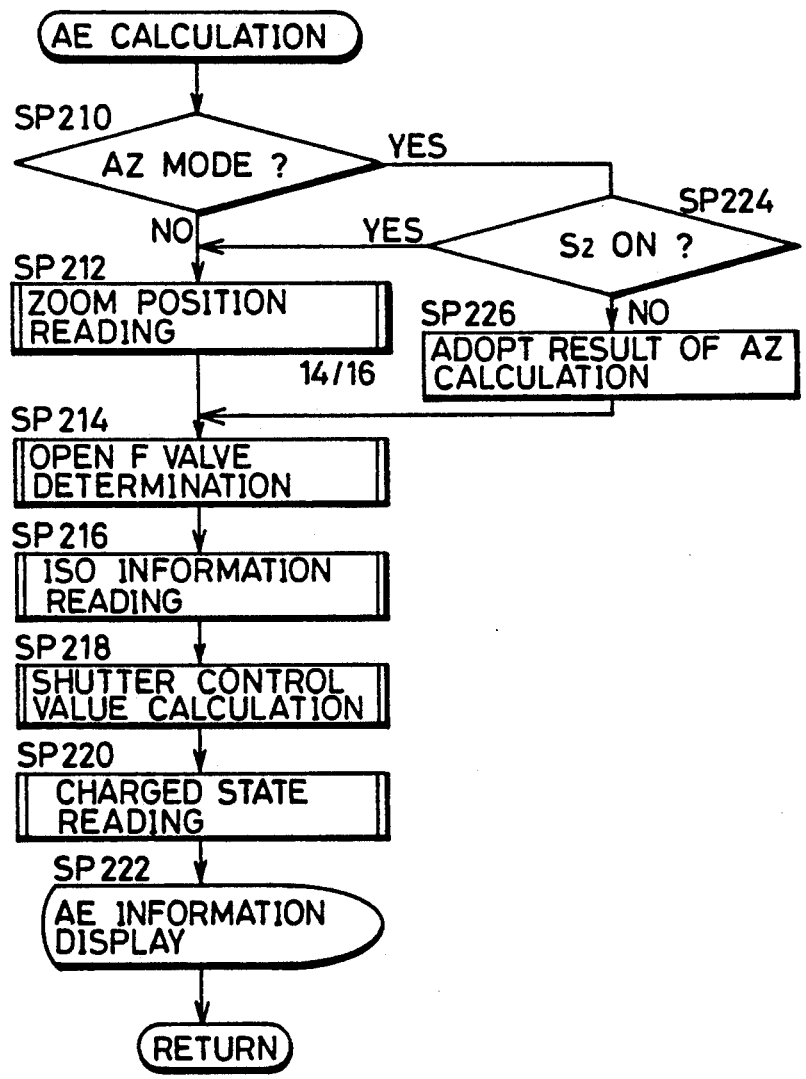
FIG. 19 is a flow chart showing an AE calculation subroutine.

Next, the AE calculation subroutine will be described. FIG. 19 is a flow chart of the AE calculation subroutine. Referring to FIG. 19, in the AE calculation subroutine, it is determined at first whether the photographing mode is the AZ mode or not (in step SP210). If it is the AZ mode, it is determined whether the release switch S2 is on or not (in step SP224). If the photographing mode is not the AZ mode or the release switch S2 is on, the zoom position is read (in step SP220). The determination in step SP224 as to whether the release switch S2 is on or not is made for the purpose of determining whether photographing operation is to be performed by assigning priority to release operation.

After the zoom position is read in step SP212, the open F value is determined. This is because the open F value differs dependent on the zoom position of the taking lens 12. If the release switch S2 is off in step SP224, the stop position calculated in the AZ calculation is adopted (in step SP226) and the processing flow proceeds to step SP214. FIG. 20 is Table (3) showing a relation between the zoom position and the open F value (AV0). The Table (3) is provided in a ROM or the RAM in the control CPU 1.

Returning to the AE calculation subroutine, after the open F value is defined, ISO information is read (in step SP216) and a shutter control value is calculated (in step SP218). A charged state of the flash unit is read (in step SP220) and after that AE information, for example, aperture valve and shutter speed is displayed in the finder (in step SP222).

Figures 21A, 21B:
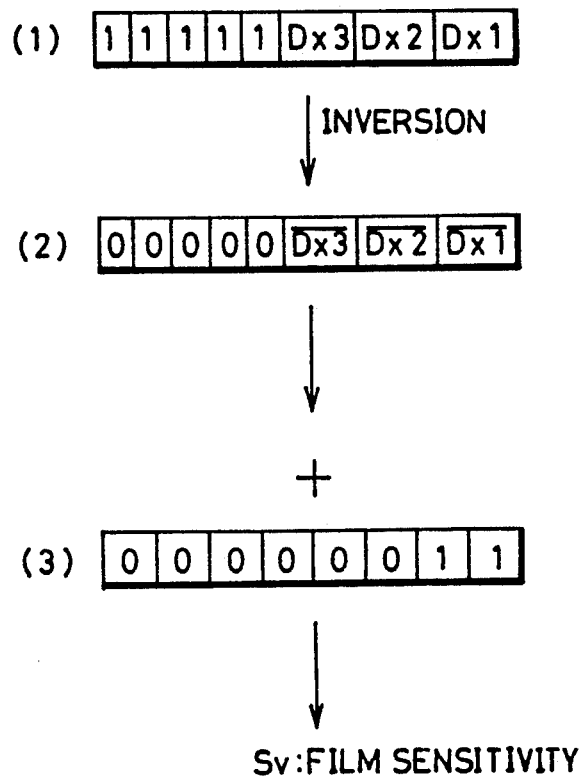
FIGS. 21A and 21B are diagrams showing processing for reading information of film sensitivity.

FIGS. 21A and 21B are diagrams for specifically explaining the reading of the ISO information in step SP216 in FIG. 19. The ISO sensitivity representing the sensitivity of a film and the corresponding ISO code are shown in FIG. 21A. The ISO sensitivity is represented with a value $S_V$, which is indicated in parentheses after the related ISO sensitivity. The method of conversion from an ISO code to the corresponding $S_V$ value will be described with reference to FIG. 21B. When the ISO information is to be read, the less significant three bits out of the eight bits of the ISO code are read. In this case, the data of the more significant five bits is 1. This state is shown in FIG. 21B (1). Then, the data shown in (1) is inverted to data shown in (2) in FIG. 21B. Then, 03H is added to the data as shown in (3) in FIG. 21B and the data thus obtained is converted to a film sensitivity $S_V$ value. The value thus obtained finally corresponds to a numerical value indicated in parentheses after each ISO sensitivity value in the film sensitivity table of FIG. 21A.

Next, the shutter control value calculation in step SP218 in FIG. 19 will be described. A shutter control value $EV_C$ is represented as follows.

$$EV_C = BV + S_V - (AV0(f_X) - AV0(f=38)) \quad (1)$$

This shutter control value EV corresponds to a focal length $f_X$. In the above indicated equation (1), the respective elements are as follows.

$EV_C$: shutter control value

Figure 15A:
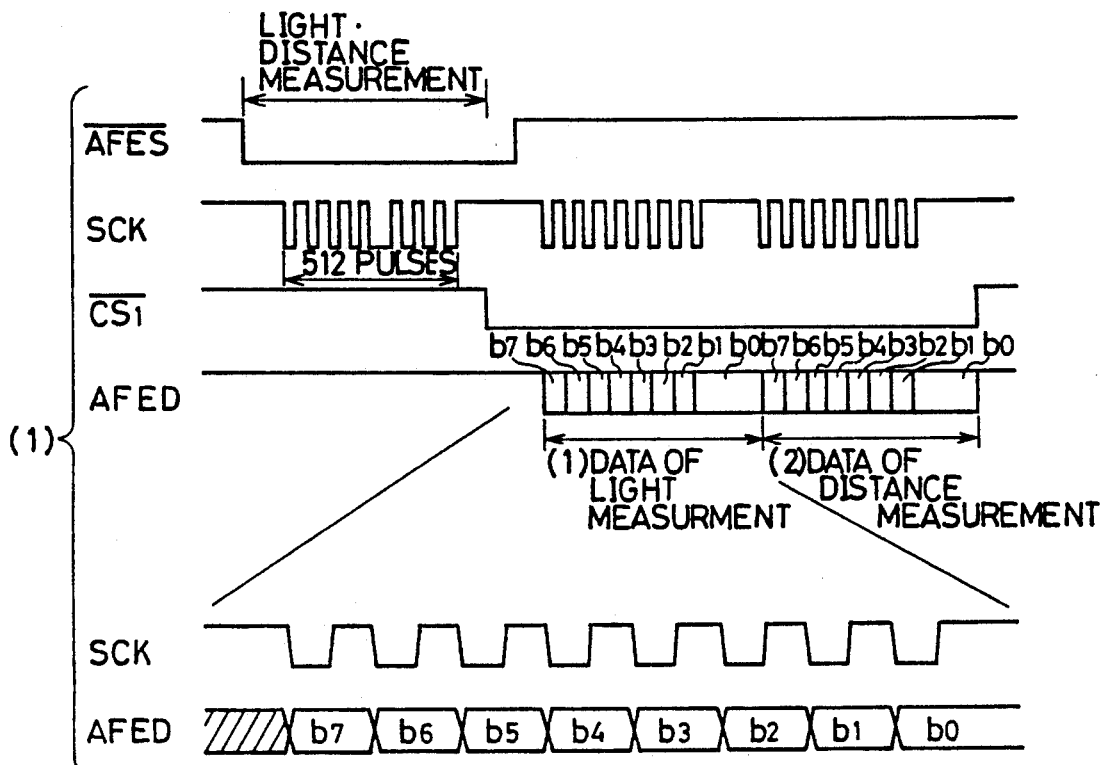
FIGS. 15A and 15B are timing charts of signals for light measurement and distance measurement.
Figure 15B:
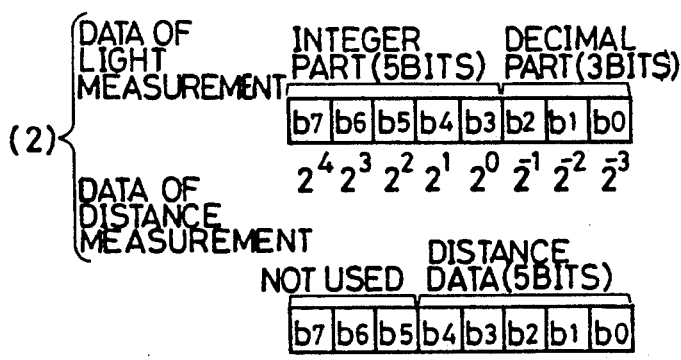

BV: measured light data indicating luminance of an object (see FIGS. 15A and 15B)

$S_V$: film sensitivity (see FIG. 21A)

AV ($f_X$): open f value with the zoom position (focal length) $f_X$ mm $AV_0$ (f=38): open f value with the focal length of 38 mm, i.e., at the wide end If the calculated value $EV_C$ is smaller than a threshold value $EV_{TH}$ for determining whether a flash mode is to be set or not, the photographing mode is automatically set to the flash mode.

Next, the AE calculation in the flash mode will be described. In the AE calculation in the flash mode, a flash AV value $AV_T$ is obtained by the below indicated equation.

$$AV_T = IV + S_V - DV - (AV(f_X) - AV(f=38)) \quad (2)$$

where

IV: flash illuminance represented by a logarithm of a guide number

DV: distance to an object represented by a logarithm of a distance

The flash AV value $AV_T$ in the flash mode calculated as described above is converted to a shutter control value by the below indicated equation.

$$EV_C = F(AV_T) \quad (3)$$

where F ($AV_T$) represents a function.

Figures 22A, 22B:
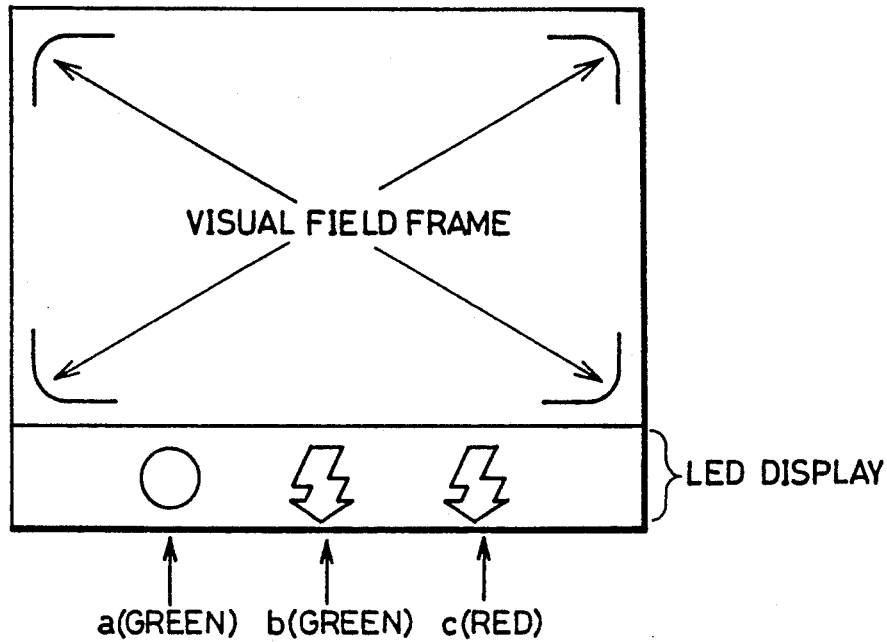
FIGS. 22A and 22B show a display state of a finder.

Next, display in the above described flash mode will be described. FIGS. 22A and 22B show the finder view of the camera shown in FIG. 1 and the contents of display. Referring to FIG. 22A, the finder view includes a visual field frame and a display portion formed by LEDs provided under the visual field frame.

The LED display portion includes a display element a to be illuminated in green, a display element b to be illuminated also in green, and a display element c to be illuminated in red. As shown in FIG. 22B, the display element a represents a non-flash mode which indicates that photographing can be carried out without flash. The display element b represents the flash mode, indicating that preparation for flashing is made, i.e., that charging is completed. The display element c indicates that the flash mode is selected and that preparation for flashing is not completed, i.e., that charging is not completed.

Figure 23:
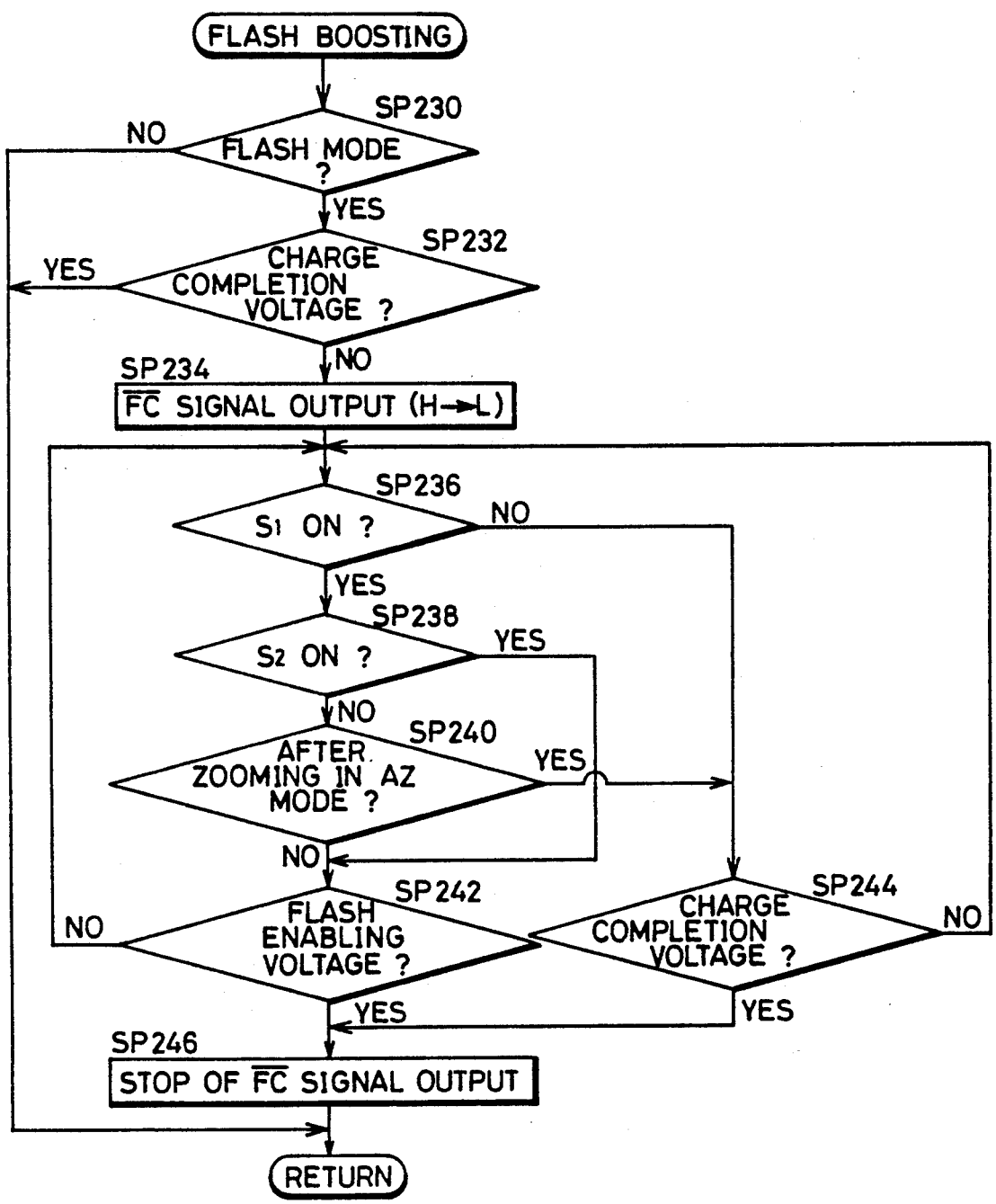
FIG. 23 is a flow chart showing a flash boosting subroutine.

FIG. 23 is a flow chart of the flash boosting subroutine. Referring to FIG. 23, when the processing flow starts the flash boosting subroutine, it is determined whether or not it is necessary to use the flash (SP230). The determination as to whether it is necessary to use the flash is effected by comparing the shutter control valve EV with the threshold value $EV_{TH}$ stored in the RAM for determining whether the flash mode is selected or not. If it is determined to be necessary to use the flash in step SP230, it is determined whether the charge for flashing is completed or not (in step SP232). Thus, in the electric circuit in FIG. 4, signals $\overline{RDY1}$, $\overline{RDY2}$ for monitoring the charge state from the flash block 5 are checked. The two signals $\overline{RDY1}$ and $\overline{RDY2}$ for monitoring the charge state are used for the purpose of detecting two charge voltages levels. The signal $\overline{RDY1}$ indicates for example that a capacitor for flash is charged with a charge completion voltage, e.g., 290 V. The signal $\overline{RDY2}$ indicates that the capacitor for flash is charged with a flash enabling voltage, e.g., 260 V. In the following description, the charge completion voltage is represented as L2 and the flash enabling voltage is represented as L1.

In step SP232, it is determined whether the capacitor for flash attains the charge completion voltage L2. If it does not attain the voltage L2, flash boosting for charging is started (in step SP234). After that, it is determined whether the light measurement switch S1 is on or not (in step SP236). If the switch S1 is on, it is determined whether the release switch S2 is on or not (in step SP238). If the switch S2 is not on, it is determined whether zooming in the AZ mode is completed or not (in step SP240). If the zooming is not completed, it is determined whether the capacitor for flash attains the flash enabling voltage L1 or not (in step SP242). If it attains the voltage L1, the flash boosting is completed (in step SP246). If it is determined in step SP230 that it is necessary to use the flash or it is determined in step SP232 that the charge of the capacitor for flash is completed, the processing flow returns. If it is determined in step SP236 that the light measurement switch S1 is not on or it is determined in step SP240 that the zooming in the AZ mode is completed, it is determined whether the capacitor for flash attains the charge completion voltage L2 or not (in step SP244). If it attains the voltage L2, the flash boosting is completed (in step SP246). If it does not attain the voltage L2, it is determined again whether the light measurement switch S1 is on or not (in step SP236). If the release switch S2 is on in step SP238, it is determined whether flash light can be immediately emitted or not (in step SP242).

In principle, if the light measurement switch S1 is on, the capacitor for flash is boosted to the flash enabling voltage L1 and if the switch S1 is off, the capacitor is boosted to the charge completion voltage L2. This is because if the light measurement switch S1 is on, the user is liable to turn on the release switch S2 and if not, the user does not take a photograph immediately. After the zooming in the AZ mode is completed, the capacitor for flash is boosted to the charge completion voltage L2 if the release switch S2 is off.

Figure 24A:
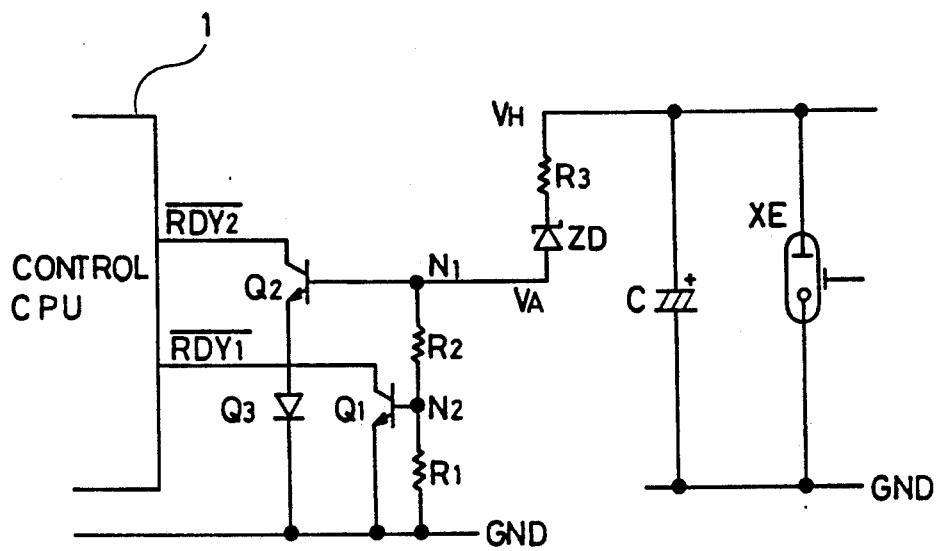
FIGS. 24A and 24B are diagrams for explaining the construction and operation of a flash boosting circuit.
Figure 24B:
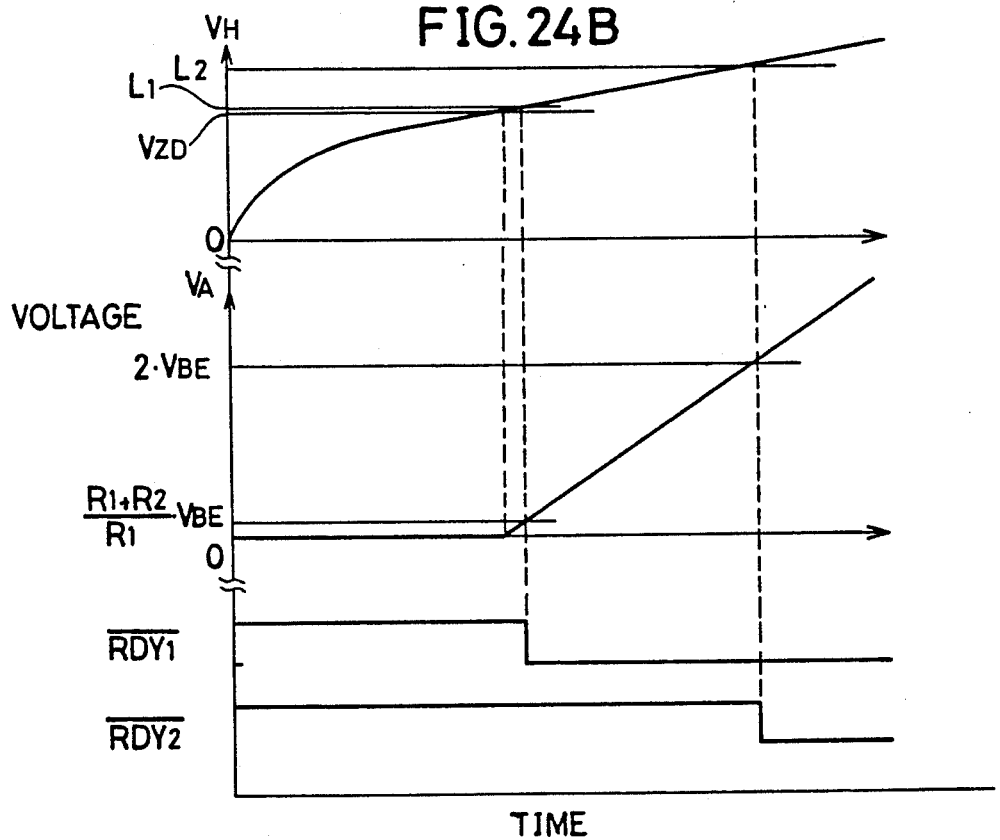

Next, the boosting of the capacitor for flash described in connection with FIG. 23 will be described in more detail. FIG. 24A is a circuit diagram for explaining the boosting of the capacitor for flash. Referring to FIG. 24A, a flash circuit includes: a transistor Q1 which is provided between the control CPU 1 and the ground GND and operates in response to the potential at a node N2 as a connection point between two resistors R1 and R2; a transistor Q2 which is provided between the control CPU 1 and a diode Q3 applying electric current only toward the ground GND and operates in response to the potential at a node N1; a charge detecting circuit connected to the node N1 and formed by series connection of a resistor R3 and a Zener diode ZD; and the capacitor C for flash and a xenon tube XE connected between a high voltage source ($V_H$) and the ground GND. Since the boosting circuit is well known, it is not shown in the figure. The values of the resistors R1 and R2 are selected to be for example 100KΩ and 10KΩ, respectively. The transistors Q1 and Q2 are used to detect potentials. If the potential at the node N1 is 1.4 V for example, the transistor Q2 is turned on and the signal $\overline{RDY2}$ is outputted. If the potential at the node N2 is 0.7 V, the transistor Q1 is turned on and the signal $\overline{RDY1}$ is outputted. Specified operation of flash boosting will be described with reference to FIG. 24B. FIG. 24B shows changes in the potential $V_H$ of the capacitor C for flash and in the potential $V_A$ at the node N1 and output states of the charge state monitoring signals $\overline{RDY1}$ and $\overline{RDY2}$ with those changes, which are represented by using an X axis as a common time axis. Although not described in detail, when the potential of the capacitor C attains the flash enabling voltage L1, the signal $\overline{RDY1}$ is outputted and when it attains the charge completion voltage L2, the signal $\overline{RDY2}$ is outputted.

Figure 25:
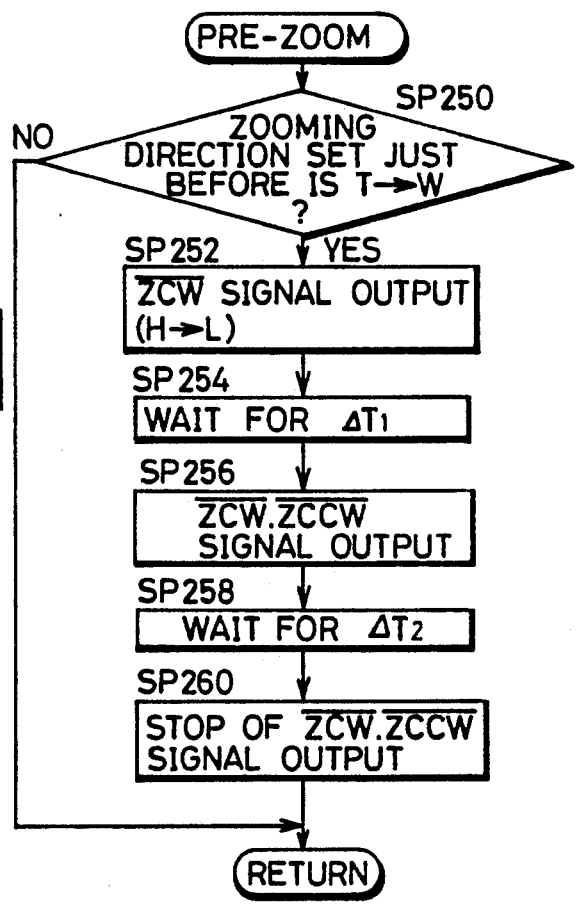
FIG. 25 is a flow chart of a pre-zoom subroutine.

FIG. 25 is a flow chart showing details of a pre-zoom subroutine. The pre-zoom is operation for reducing a gap of a pin 33 in a cam groove 31 of the lens barrel 21 constantly toward the same direction.

Figure 26A:
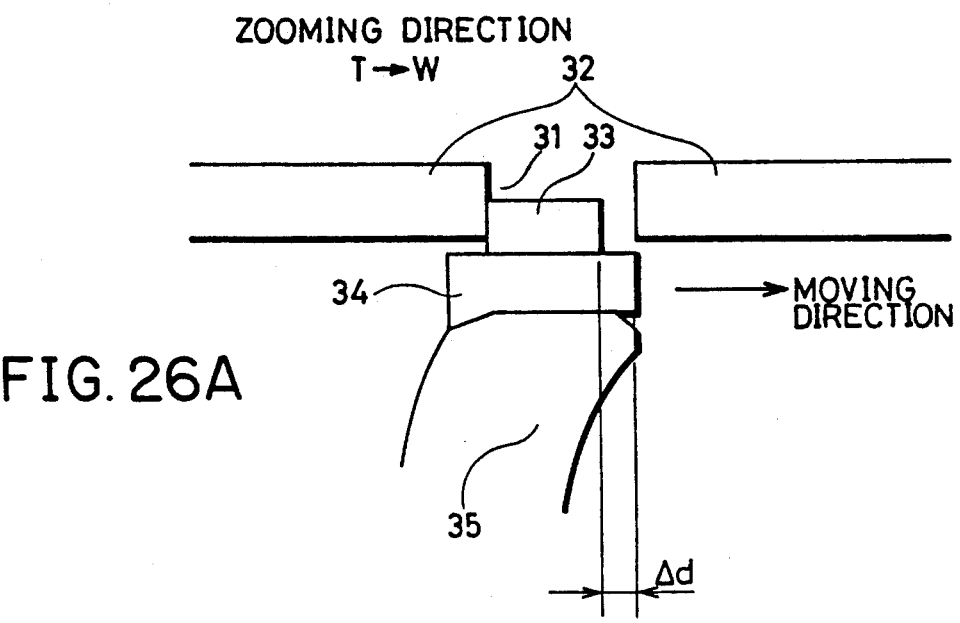
FIGS. 26A and 26B show a section of a lens barrel unit.
Figure 26B:
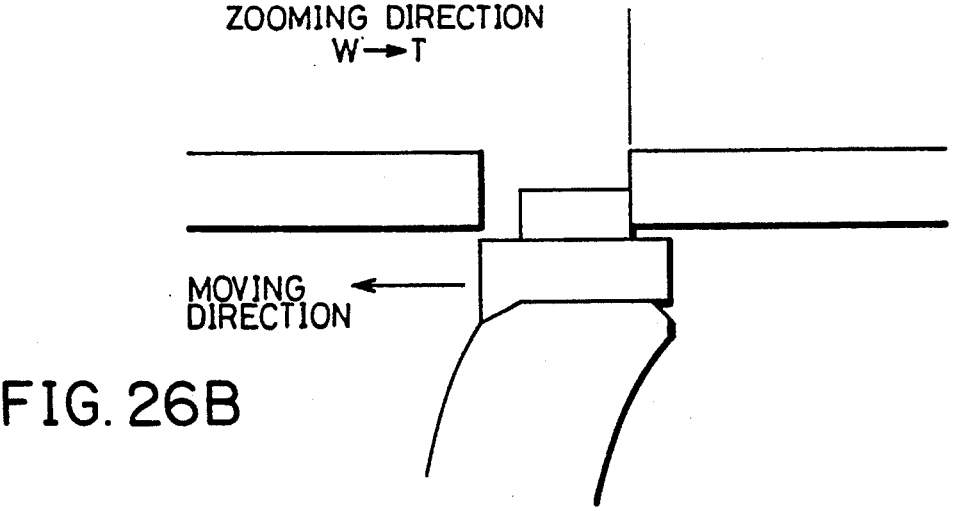

FIGS. 26A and 26B show a section of the lens barrel portion. Referring to FIGS. 26A and 26B, the lens barrel 21 is provided with a cam ring 32 which has the cam groove 31. In order to move the taking lens 12 to set a predetermined focal length, the pin 33 moves along the cam groove 31 with a lens frame 34 provided on the circumference of the taking lens 12. As shown in FIGS. 26A and 26B, the width of the pin 33 is smaller than that of the cam groove 31. Accordingly, a certain gap exists dependent on the moving direction of the taking lens 12 and even if the lens barrel 21 is rotated by the zoom motor M1, the quantity of rotation of the zoom motor M1 and the moving amount of the taking lens 12 are not proportional to each other. FIG. 26A indicates a positional relation between the pin 33 and the cam groove 31 in the case where the zooming direction is the wide direction, and of FIG. 26B shows a positional relation in the case where the zooming direction is the tele direction.

Referring to and of FIG. 26B, if the zooming direction is changed, an error of Δd is caused in the lens position even in the case of the same zoom position, resulting in lowering of the optical characteristics. Therefore, if the zooming direction is the wide direction as shown in FIG. 26A, fine zooming is effected toward the tele direction at an initial stage of release operation and the pin 33 is positioned constantly as shown in FIG. 26 whereby the error Δd in the lens position in the case of the same zoom position can be practically eliminated.

Returning to the flow chart of pre-zoom in FIG. 25, it is determined at first whether the zooming direction set just before was the wide direction or not (in step SP250). If so, it is necessary to carry out pre-zoom operation to eliminate the error Δd and thus a signal $\overline{ZCW}$ is outputted to rotate the zoom motor M1 in the regular direction (in step SP252). Then, there is a wait for a predetermined rotation time (ΔT1) (in step SP254) and in order to apply the brake on the zoom motor M1, the signals $\overline{ZCW}$, $\overline{ZCCW}$ are outputted (in step SP256). After a wait for a prescribed braking time (ΔT2) (in step SP258), the output of the signals $\overline{ZCW}$, $\overline{ZCCW}$ is stopped to turn off the zoom motor M1 (in step SP260). If it is determined in step SP250 that the zooming direction set just before is not the wide direction, it is not necessary to carry out pre-zoom operation and the processing flow returns.

The braking time (ΔT2) is shorter than a time (ΔTs) required for actually stopping the rotation of the motor M1. Thus, a time lag in release operation can be suppressed to the minimum. Practically, the zoom motor M1 is stopped during lens setting (d) to be described afterwards. If the power supply for drive is formed by a constant voltage or constant current circuit, the moving amount of the taking lens 12 can be always maintained constant.

Figure 27:
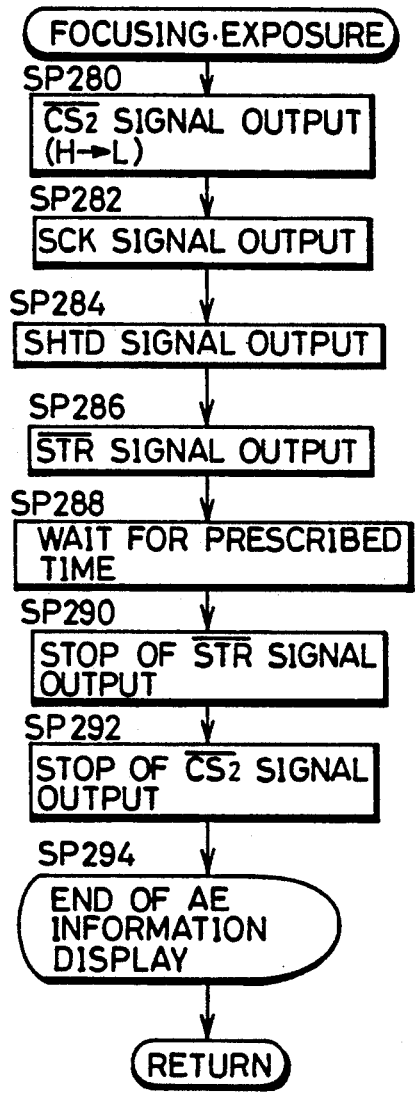
FIG. 27 is a flow chart of a focusing•exposure subroutine.

FIG. 27 is a flow chart showing the focusing•exposure subroutine. The focusing and exposure operations are performed only by transmitting focusing data and shutter control data to the shutter block 3 and outputting the signal $\overline{STR}$ instructing a start of focusing. Referring to FIG. 27, in the focusing•exposure subroutine, the signal $\overline{CS2}$ is outputted to designate a destination of data output and to turn on the shutter block 3 (in step SP280). Then, the signal SCK as the serial communication clock signal is outputted (in step SP282), the focusing data (the lens setting data), and the shutter control data are outputted (in step SP284), and the signal $\overline{STR}$ for instructing the start of focusing is outputted (in step SP286). Then, there is a wait for a prescribed time until completion of exposure (in step SP288) and after that the output of the signal $\overline{STR}$ is stopped to turn off the shutter block 3 (in step SP290), the output of the signal $\overline{CS2}$ is stopped (in step SP292), and the LED display in the finder shown in FIG. 23 is turned off (in step SP294).

A flash trigger signal TRG (see the electric circuit diagram of FIG. 4) in the case of the flash mode is automatically outputted from the shutter block 3 to the flash block 5 when the bit 7 (b7) of the shutter control data is set.

Figure 28:
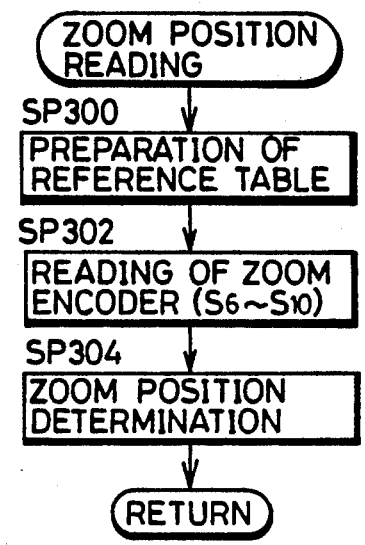
FIG. 28 is a flow chart of a zoom position reading subroutine.

Next, the zoom position reading subroutine will be described. FIG. 28 is a flow chart showing the zoom position reading subroutine. Referring to FIG. 28, in the zoom position reading subroutine, a reference table (4) is prepared at first (in step SP300). A hexadecimal signal is read from the zoom encoder (in step SP302) and the zoom position data is accessed by using the signal as an address, whereby the zoom position is determined (in step SP304).

FIG. 29 is a diagram showing the reference table (4) for zoom position reading described in step SP300 in FIG. 28. Referring to FIG. 29, an address is represented by the less significant five bits out of the eight bits. Next, the method of reading this table (4) will be described by taking an example. Assuming that 13H is read as a zoom encoder signal, a zoom position data 8 (a decimal number) is obtained by using the signal 13H as an address. In this case, the typical f value is 70 mm from the zoom encoder explanation diagram of FIG. 3. The zoom position data 0 indicates the position data which cannot be generated.

Figure 30:
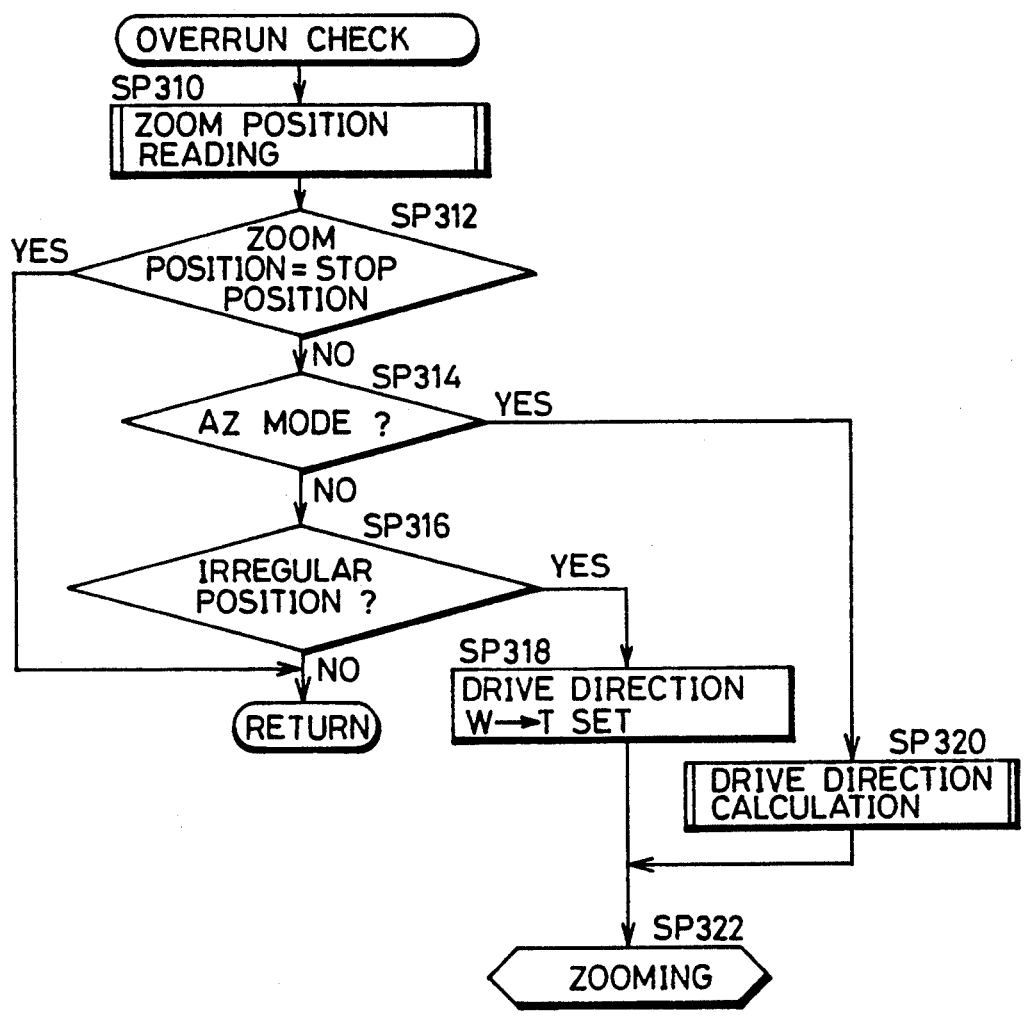
FIG. 30 is a flow chart showing an overrun check subroutine.

Next, the overrun check subroutine will be described. FIG. 30 is a flow chart showing the overrun check subroutine. In case of overrun of the taking lens 12, it is driven again to the desired position if the photographing mode is the AZ mode. If the photographing mode is not the AZ mode, the taking lens 12 is driven again only if it is in an irregular position. The irregular position of the taking lens 12 is a position from the wide end to the retracted position.

In the overrun check subroutine, first, the zoom position is read (in step SP310) and it is determined whether or not the read zoom position is the stop position of the taking lens 12 calculated in step SP204 in FIG. 17 (in step SP312). If it is not the calculated stop position, it is determined whether the photographing mode is the AZ mode or not (in step SP314). If it is not the AZ mode, it is determined whether the taking lens 12 is in the irregular position or not (in step SP316). If the taking lens 12 is not in the irregular position, the processing flow returns. If the zoom position read in step SP312 is the calculated stop position, the processing flow immediately returns. If it is determined in step SP314 that the photographing mode is the AZ mode, the drive direction is calculated from the calculated stop position and the read zoom position (in step SP320) and zooming operation is performed (in step SP322). If it is determined in step SP316 that the taking lens 12 is in the irregular position, the drive direction of the taking lens 12 is set to the tele direction (in step SP318) since exit from the irregular position is always made by driving the lens 12 toward the tele direction. Then, zooming operation is carried out (in step SP322).

Figure 31:
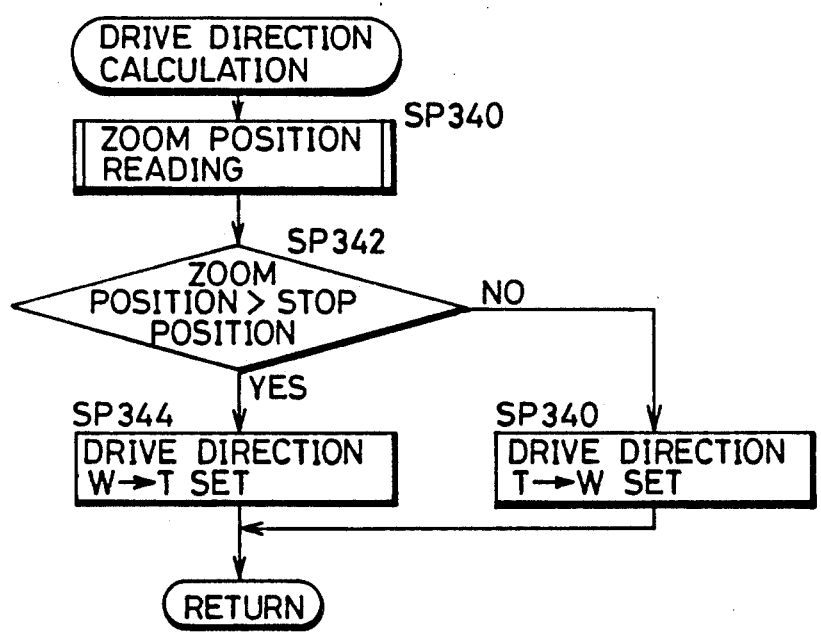
FIG. 31 is a flow chart showing a drive direction calculation subroutine.

Next, the drive direction calculation subroutine will be described. FIG. 31 is a flow chart of the drive direction calculation subroutine. Referring to FIG. 31, in the drive direction calculation subroutine, the zoom position is read at first (in step SP340). Next, it is determined by referring to the number of the stop position whether the number of the zoom position is larger than that of the calculated stop position (in step SP342). If it is determined that the number of the zoom position is larger than that of the calculated stop position, the drive direction is set to the tele direction (in step SP344) and in the opposite case, the drive direction is set to the wide direction (in step SP340). This drive direction is memorized in the RAM of the control CPU 1.

Figure 32:
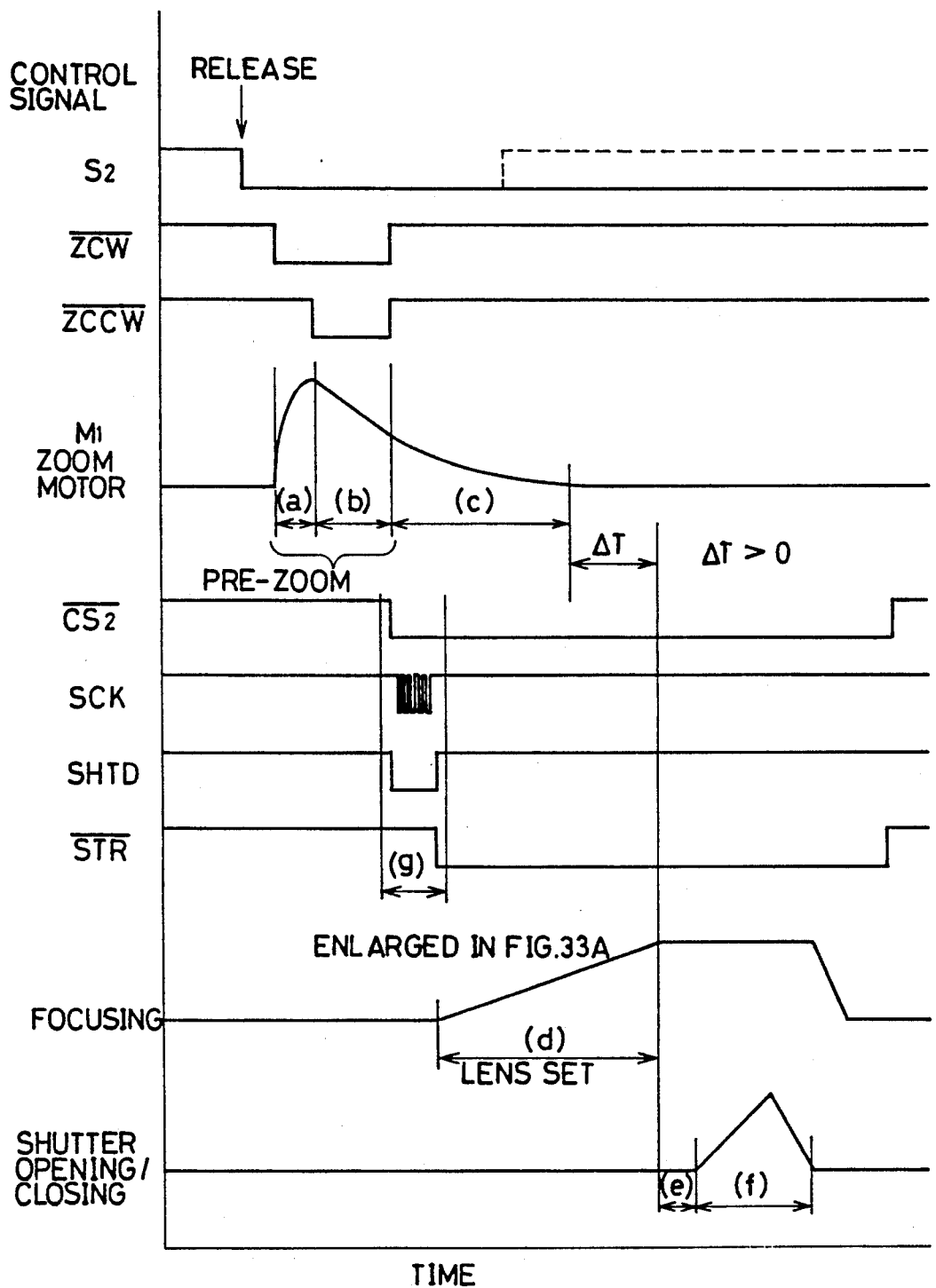
FIG. 32 is a timing chart in release operation.

FIG. 32 is a diagram for explaining timing in release operation in the case of pre-zoom operation. Referring to FIG. 32, when the release switch S2 is turned on, the signal $\overline{ZCW}$ for starting the regular rotation of the zoom motor M1 is outputted and then the signal $\overline{ZCCW}$ for stopping the zoom motor M1 is outputted. A change in speed of the zoom motor M1 is indicated in FIG. 32. More specifically, when the release switch S2 is turned on, pre-zoom operation is performed in response to the regular rotation start signal and the brake signal of the zoom motor M1 and after that the zoom motor M1 stops through its inertial rotation. The period for starting the rotation of the motor M1 is represented by (a), the braking period is represented by (b) and the inertial rotation period is represented by (c) in FIG. 32. After the pre-zoom operation is terminated, the signal $\overline{CS2}$ for designating a destination of data is outputted and the signal is transmitted to the shutter block 3. Thus, the serial communication clock signal SCK is outputted and in synchronization therewith, an output signal $\overline{SHTD}$ is outputted to provide the focusing data and the shutter control data. After the focusing data and the shutter control data are provided, a focusing start instruction signal $\overline{STR}$ is outputted. As a result, focusing as shown in a lower portion of FIG. 32 is started, so that the lens 12 is set for focusing. The period required for the setting of the lens is for example about 150 m sec. and this period is represented by (d). After the focusing, the shutter is opened and closed. Before the opening and closing of the shutter, a time (e) for setting the lens stable is given and after that, exposure (f) is effected. Referring to the operation diagram related with the focusing signal and the zoom motor M1 in FIG. 32, the pre-zoom operation and the inertial rotation of the zoom motor M1 need to be terminated before completion of the focusing. In other words, the time represented by T in the figure needs to be positive. A release time lag in the period after the turn-on of the release switch S2 to the completion of the focusing is about 0.4 second at most.

Next, the timing for data transmission to the shutter block in release operation shown in (e) and (g) in FIG. 32 will be described. FIG. 33A is a diagram showing details of the timing for data transmission to the shutter block in release operation. Referring to FIG. 33A, when a signal $\overline{CS2}$ for designating a destination of data in the shutter block is outputted, a serial communication clock signal SCK is outputted in response thereto. In response to each cycle of the serial communication clock signal SCK, the shutter data SHTD of eight bits are serially outputted in the order of the focusing data and the shutter control data. After the output of the focusing data and the shutter control data, the focusing start instruction signal $\overline{STR}$ is outputted. Referring to FIG. 33B, the contents of the shutter data $\overline{SHTD}$ will be described. The shutter data $\overline{SHTD}$ includes the focusing data and the shutter control data $EV_C$. The focusing data and the shutter control data $EV_C$ are both 8-bit data. In the focusing data, the less significant five bits out of the eight bits are used and the more significant three bits are set to 0. In the shutter control data $EV_C$, the most significant bit indicates whether the photographing mode is the flash mode or the non-flash mode, the subsequent more significant five bits represent an integer part and the less significant two bits represent a decimal part. If the most significant bit is 1, it indicates the flash mode and if the most significant bit is 0, it indicates the non-flash mode.

Figures 34A, 34B:
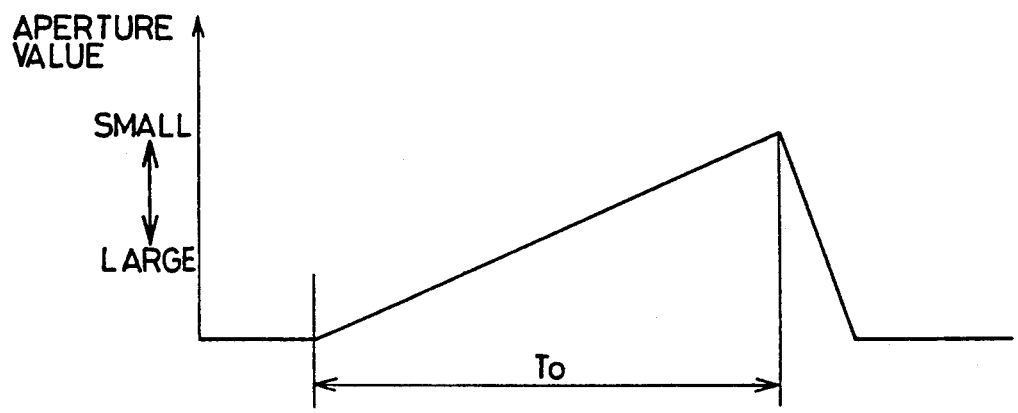
FIGS. 34A and 34B are diagrams showing a specified example of shutter control data.

Next, the shutter control data $EV_C$ described in connection with FIG. 33B will be described in more detail with reference to FIGS. 34A and 34B. FIG. 34A is a graph in which the Y axis represents an aperture value (F value) and the X axis represents a time. Referring to FIG. 34A, the smaller the aperture value (F value) is, the larger the shutter opening time To is. The triangular area in FIG. 34A corresponds to an exposure amount.

FIG. 34B shows an example of the value $EV_C$ of the shutter control data. Referring to FIG. 34B, if the shutter control data value $EV_C$ is defined, the shutter opening time To corresponding thereto is defined. In this case, the shutter opening time To is represented in millisecond.

(2) Second Embodiment

The second embodiment of the present invention will be described. In the first embodiment, the magnification setting in auto zooming is based on the magnitude of one person in the height direction. According to the second embodiment, magnification setting in auto zooming is also applied to cases such as a souvenir picture in which plural persons pose side by side. Since the second embodiment is substantially the same as the first embodiment, only the different features will be described in the following.

Figure 35:
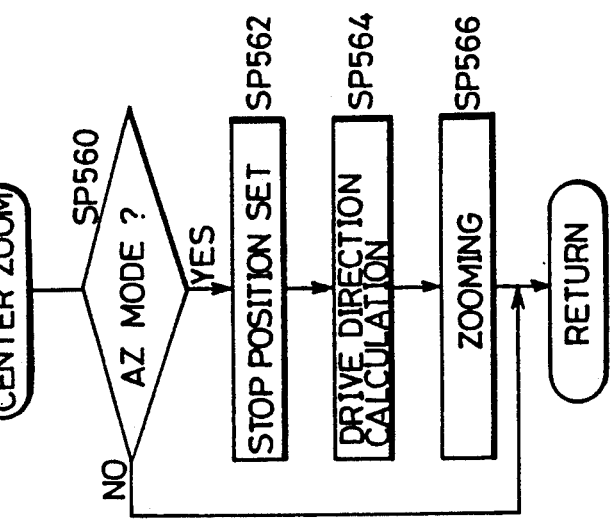
FIG. 35 is a flow chart showing a center zoom subroutine according to a second embodiment of the present invention.

According to the second embodiment, multiple-point measurement of distance is applied for the purpose of focusing in such cases as described above in which plural persons pose side by side. Accordingly, as is different from the first embodiment, if the object is to be photographed in the auto zoom mode, center zooming is effected. FIG. 35 is a flow chart showing a center zoom mode subroutine for carrying out such center zooming operation. In the center zoom subroutine, it is determined at first whether the photographing mode is the AZ mode or not (in step SP560). If it is the AZ mode, the prescribed stop position is set (in step SP562) and the drive direction is calculated and set (in step SP564), so that zooming operation is carried out (in step SP566). If it is determined in step SP566 that the photographing mode is not the AZ mode, the processing flow immediately returns.

The prescribed stop position is for example the center zoom position "10" among the 19 zoom positions shown in FIG. 20.

Figure 36:
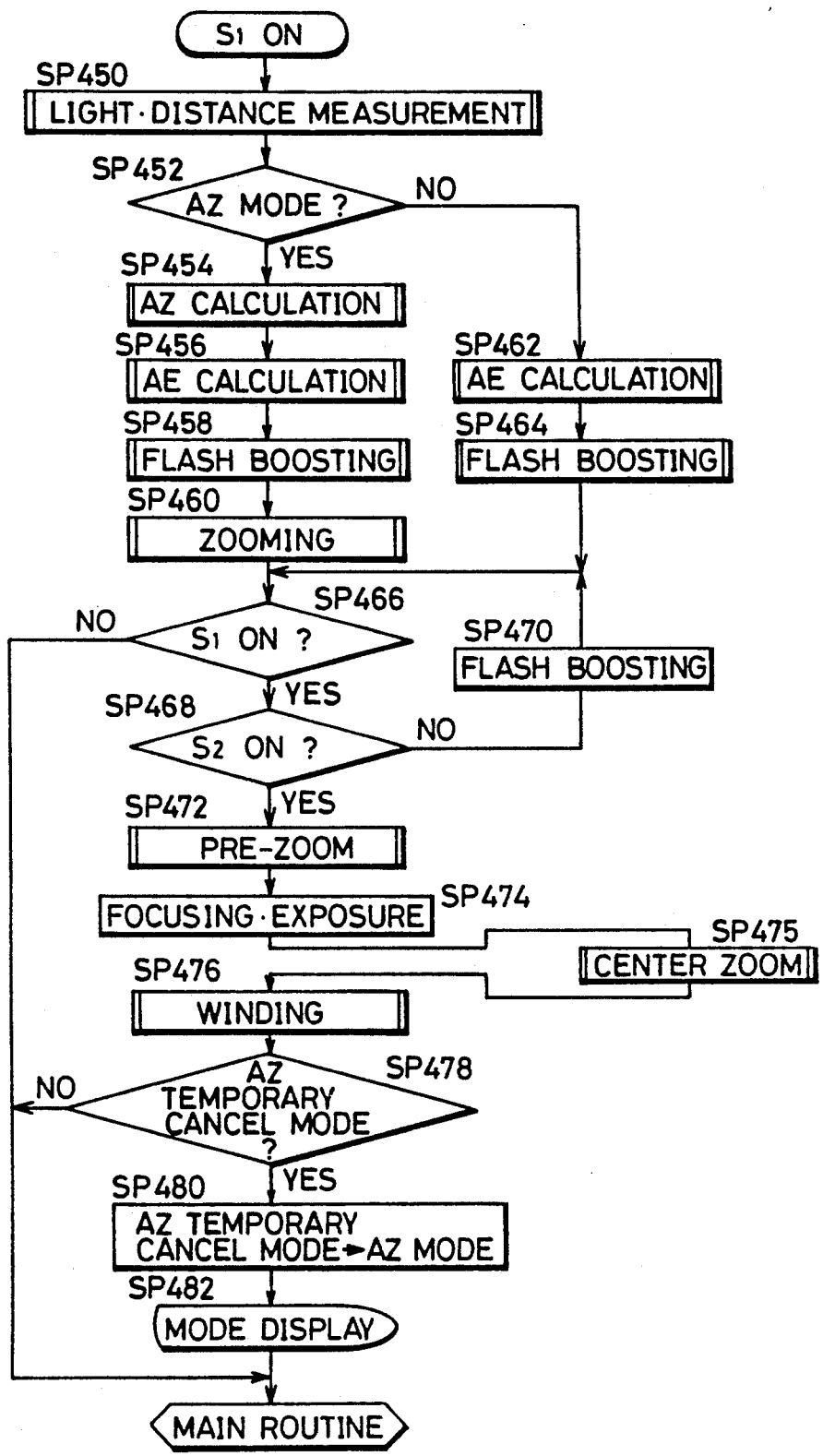
FIGS. 36 to 38 are flow charts in the second embodiment corresponding to FIGS. 10, 11 and 18 in the first embodiment.
Figure 37:
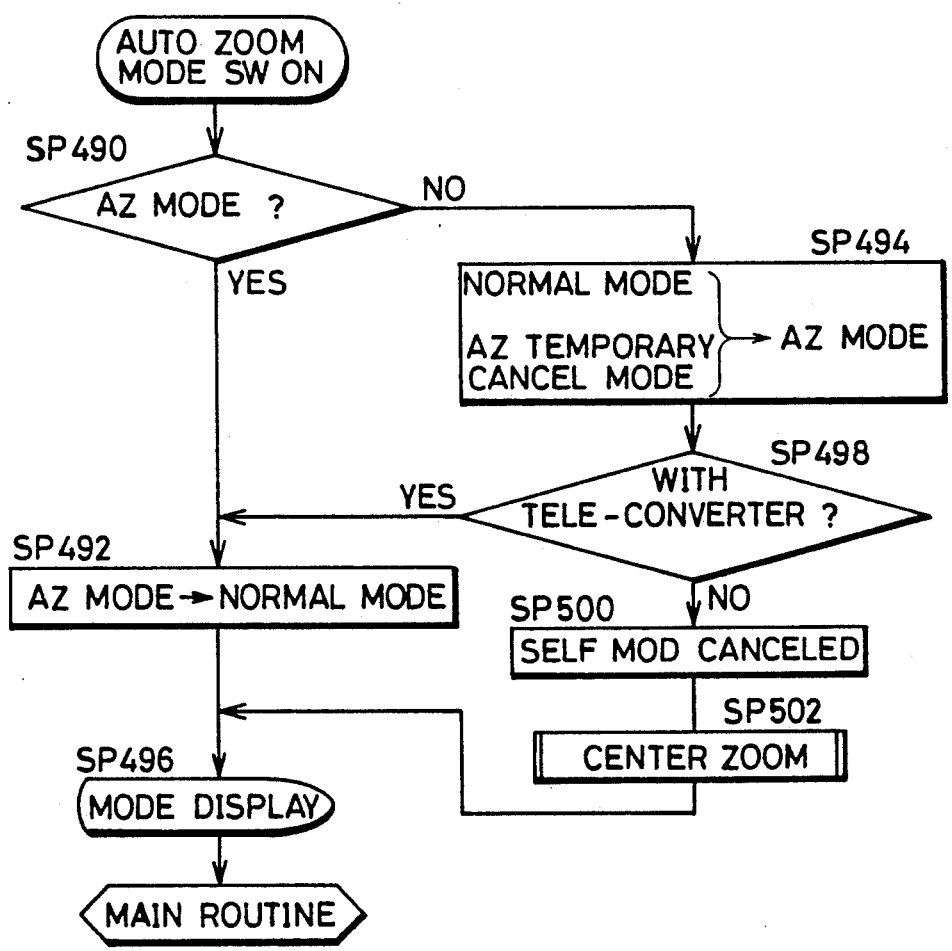
Figure 38:
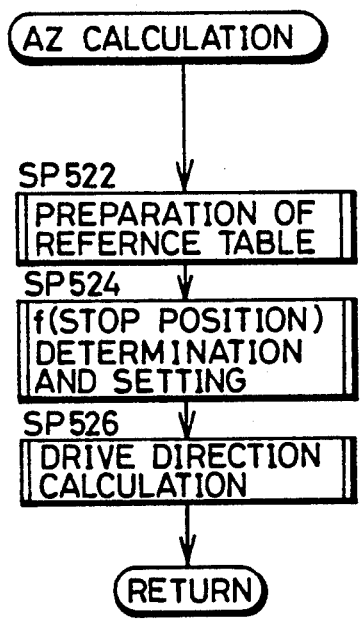

In the second embodiment, the above described center zoom mode subroutine is executed in the case where the light measurement switch S1 is depressed and in the case where the auto zoom mode switch S3 is depressed. FIGS. 36 and 37 show flow charts in which the center zoom mode subroutine is used. According to the second embodiment, since the multiple-point measurement of distance is applied, the filtering in step SP200 of the AZ calculation subroutine (in FIG. 17) in the first embodiment is not applied. An AZ calculation subroutine in the second embodiment is shown in FIG. 38.

Figure 39A:
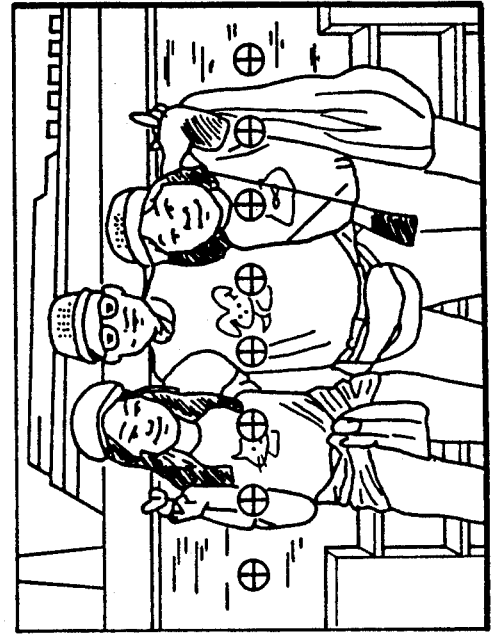
FIGS. 39A to 39C are illustrations for explaining the meritorious effect of the second embodiment.
Figure 39B:
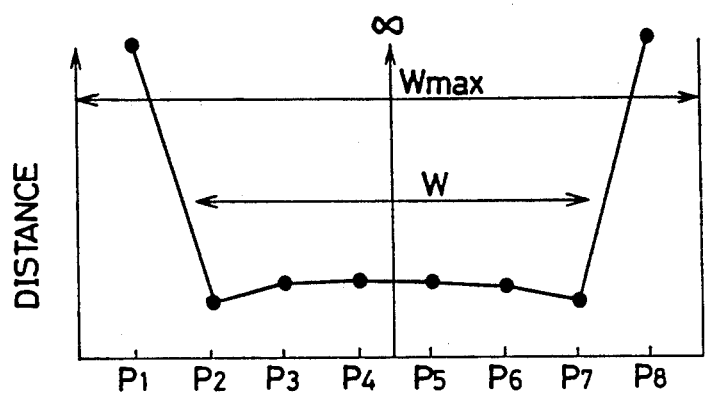
Figure 39C:
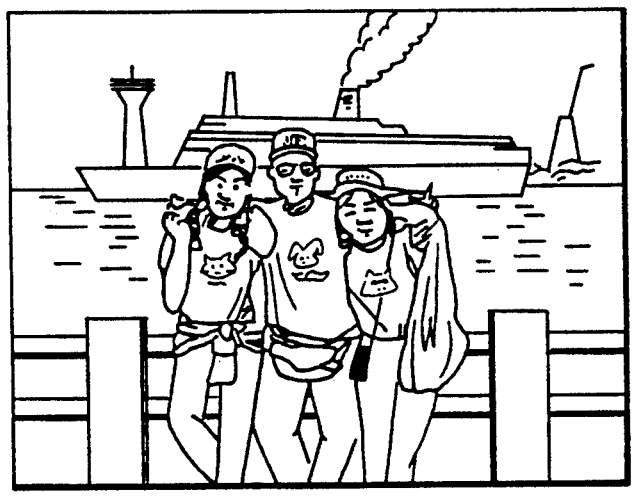

FIGS. 39A and 39C are diagrams for explaining relations between unsuitable magnifications and suitable magnifications. FIG. 39A shows a picture taken with an unsuitable magnification. In this case, the background is not suitably photographed. Such pictures are often taken by using a camera having a conventional auto zoom function. In FIG. 39A, the points shown by ⊕ are points for light and distance measurement. In this figure, the distance measurement and light measurement are carried out with eight points P1 to P8.

By contrast, FIG. 39C shows a picture taken with a suitable magnification. The method for taking pictures with suitable magnifications will be described below.

FIG. 39B is a distance distribution diagram showing a relation between the positions of the distance measurement points (P1 to P8) and distances at the respective points. Referring to FIG. 39B, Wmax represents a horizontal length on the plane allowed to be taken in the picture frame and W represents a horizontal dimension of an object.

A method of determining a magnification in auto zooming taking account of the horizontal dimension will be described. In such cases as a souvenir picture, the optimum value of a proportion of an object occupied in the horizontal direction ($k_W = W/Wmax$) is generally about $k_W = 0.5$. Consequently, assuming that the present magnification is $\beta$, the suitable magnification $\beta_W$ of the object having a horizontal extension is as follows:

$$\beta_W = \frac{8}{N-1} k_W \cdot \beta \quad (4)$$

where N is an effective distance measurement numerical point, which is a number of data within a prescribed distance from the nearest distance ($D_{NR}$), for example, N=6 (P2 to P7) in the case of FIG. 39B. Accordingly, if auto zooming is effected based on the magnification $\beta_W$ obtained by the calculation of the above indicated equation, the picture as shown in FIG. 39C is obtained. The magnification $\beta_W$ is adopted in the case of W/Wmax≧0.75 for example and, in other cases in which a general type of picture of an object not having horizontal extension is considered to be taken, the present photographing magnification $\beta$ is adopted.

Figure 9:
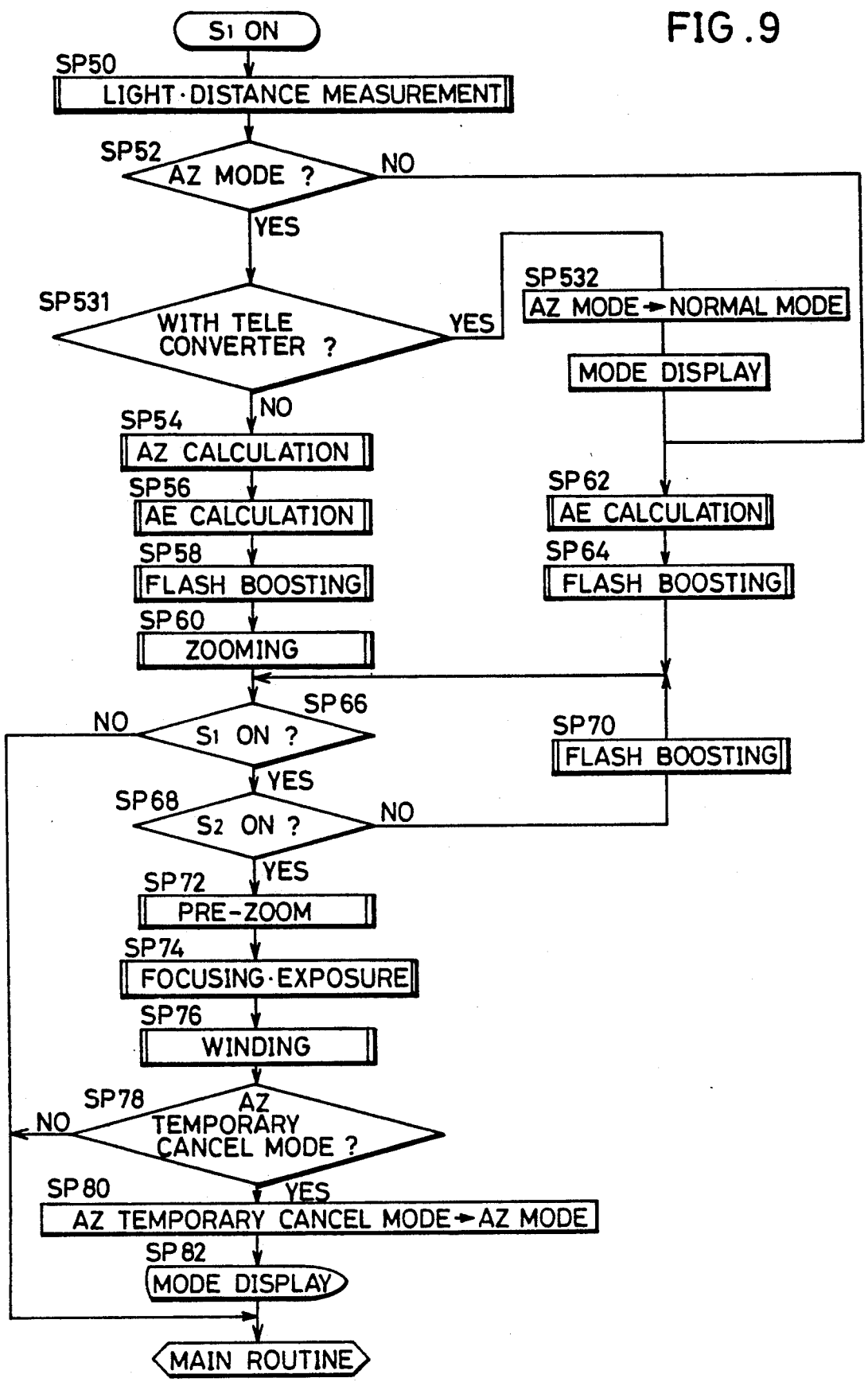

FIGS. 35 to 37 are flow charts according to the second embodiment corresponding to FIGS. 9, 10 and 17 of the first embodiment.

(3) Third Embodiment

The third embodiment of the present invention will be described below.

According to the first embodiment, the set magnification in auto zooming is fixed, while according to the third embodiment, a magnification set by the auto zoom function can be changed.

When the set magnification is changed, the focal length f of the taking lens 12, obtained by the auto zooming operation is calculated conversely and the magnification at that time is obtained. The magnification thus obtained is set as the photographing magnification. Therefore, according to the third embodiment, the user can set the magnification in auto zooming while actually watching the finder and observing the object image.

Since the third embodiment is substantially the same as the first embodiment, only the different features will be described below.

Figure 40:
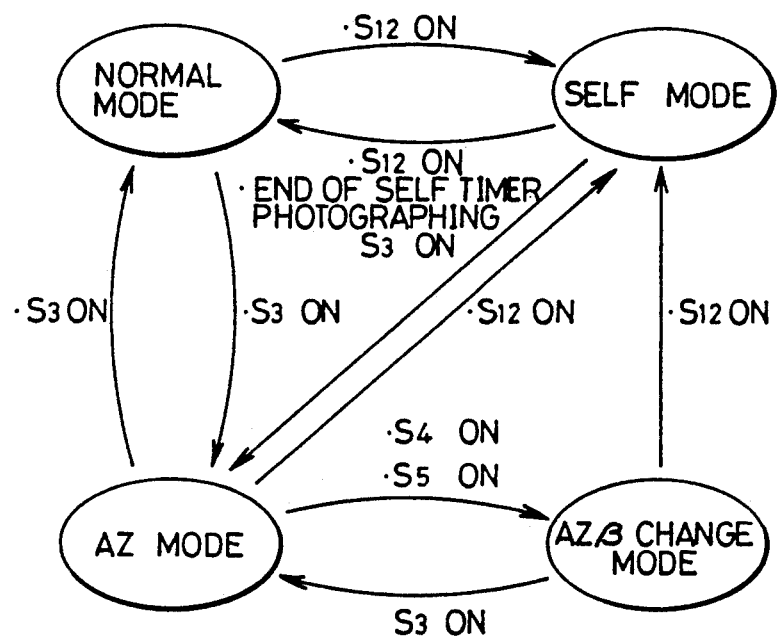
FIG. 40 is a diagram showing stitching among respective photographing modes according to a third embodiment of the present invention.

According to the third embodiment, the AZ temporary cancel mode described in connection with FIG. 6 of the first embodiment is changed to an AZ $\beta$ change mode as shown in FIG. 40. A switch used for the mode change is the same as in the case of the AZ temporary cancel mode. When the photographing mode is set to the AZ$\beta$ change mode, a desired photographing magnification is set in the below described manner.

The AZ$\beta$ change mode is used in cases as described below. For example, if the AZ mode is set, the size of an object (the photographing magnification) is defined by the camera. However, it may happen that the user does not desire that size. In such a case, the zoom operation lever 14 is operated to set the AZ$\beta$ change mode, which makes it possible to change the size of the object.

In the third embodiment, the AZ$\beta$ change mode is used in place of the AZ temporary cancel mode in the first embodiment. Accordingly, the portions corresponding to those in FIG. 1 are modified.

Figure 41:
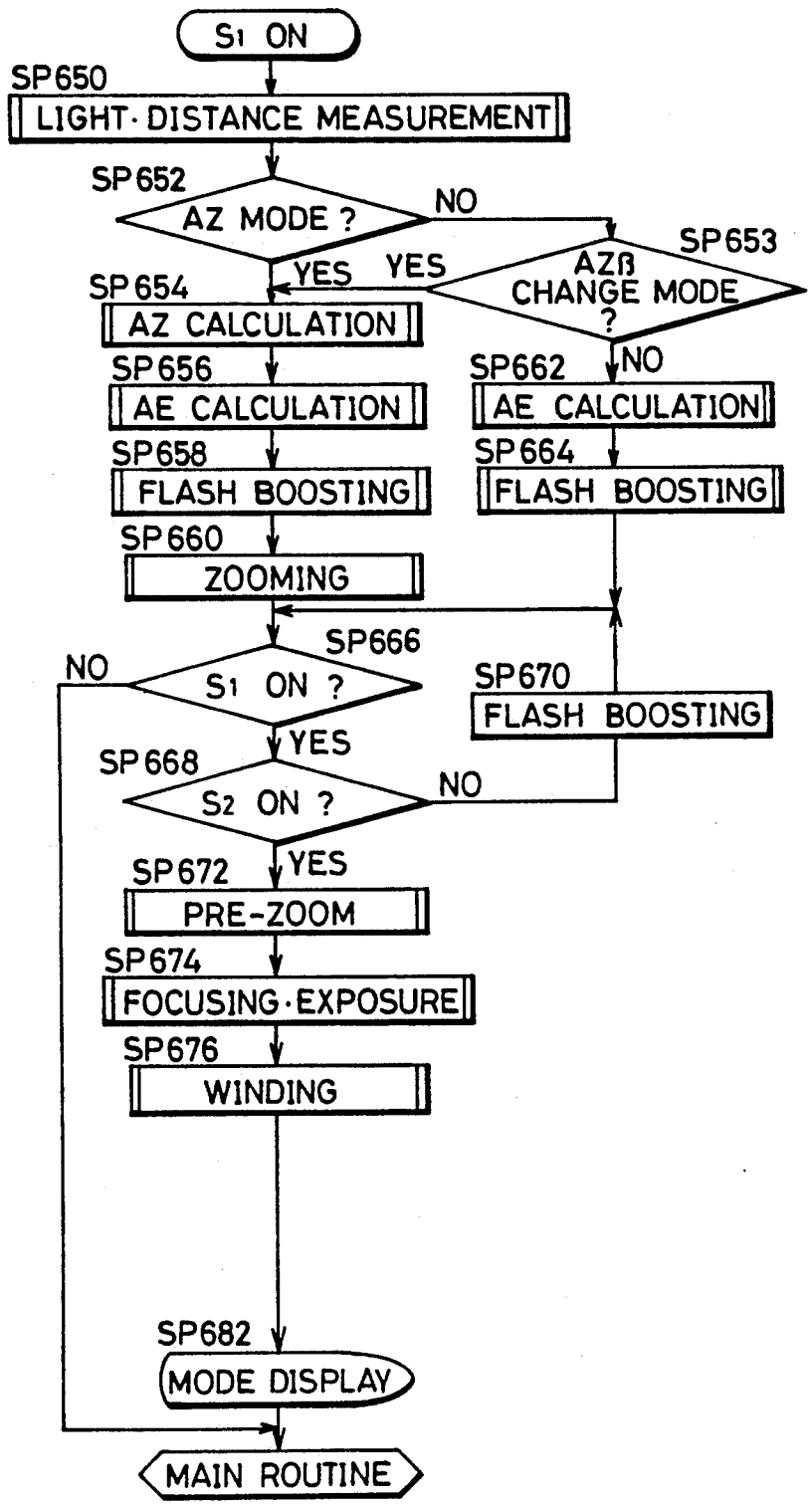
FIGS. 41 to 46 are flow charts in the third embodiment corresponding to FIGS. 9, 10, 11, 8, 12 and 30 in the first embodiment.
Figure 42:
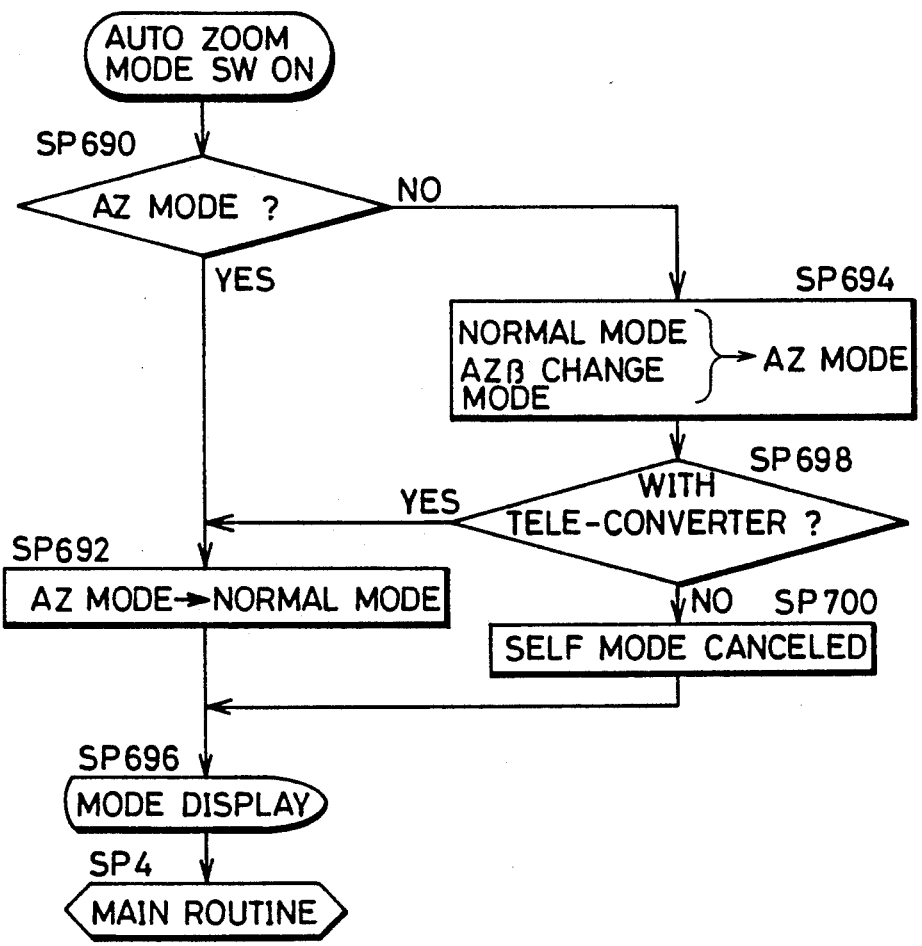
Figure 43:
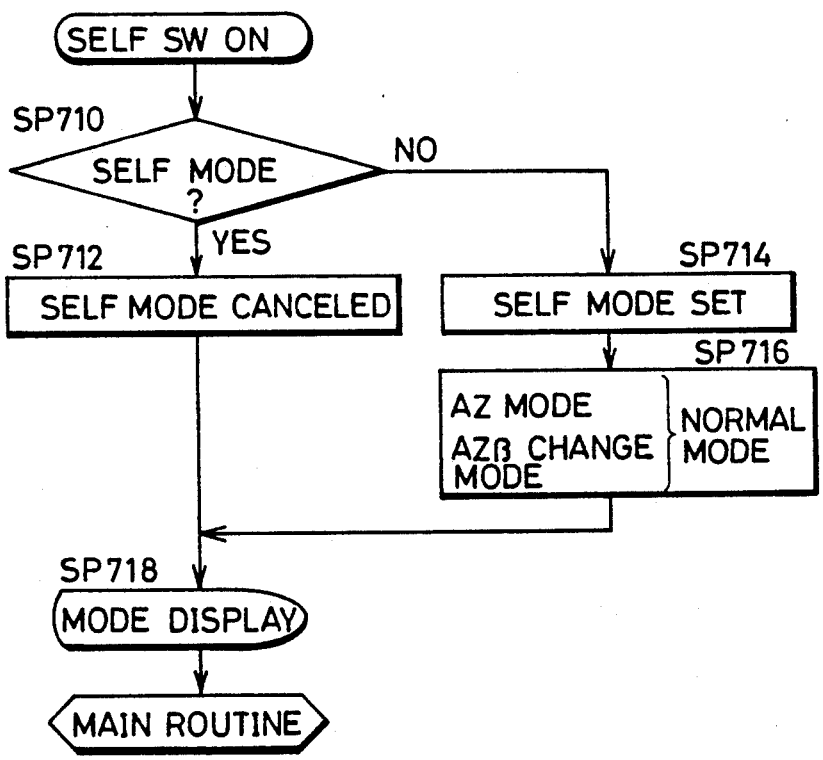

Such modifications are shown in FIGS. 41 to 43. Those figures correspond to FIGS. 10 to 12 in the first embodiment.

Figure 44:
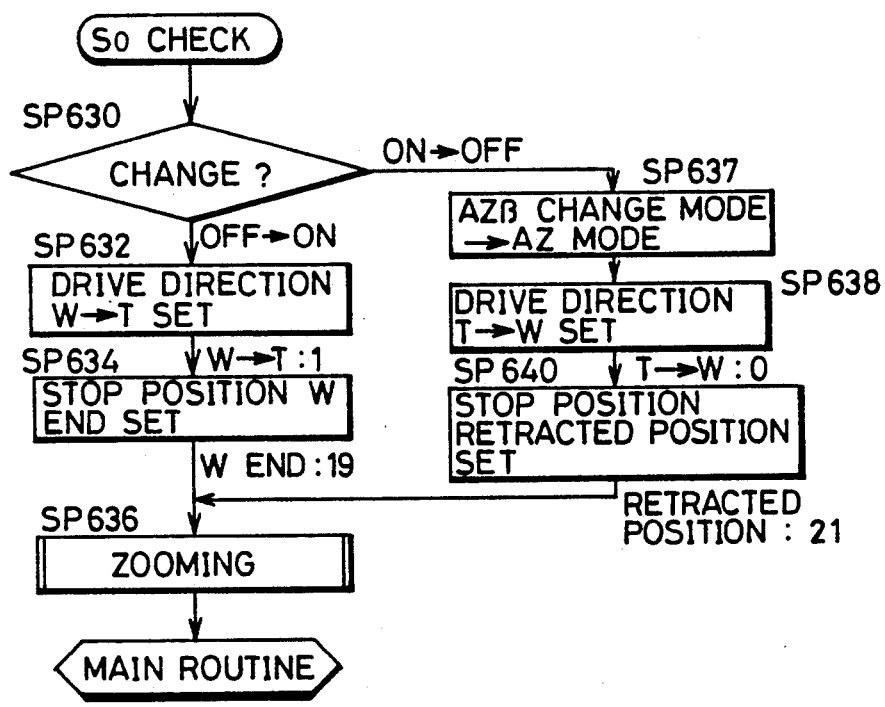

FIG. 44 is a main switch S0 check subroutine corresponding to FIG. 9 of the first embodiment. Referring to FIG. 44, according to the third embodiment, when it is determined that the change of the state of the main switch S0 is from the on state to the off state (in step SP630), retracting operation is carried out (in steps SP368 to SP640) after the photographing mode is changed to the AZ mode (in step SP637) if it has been the AZ$\beta$ change mode.

Figure 45:
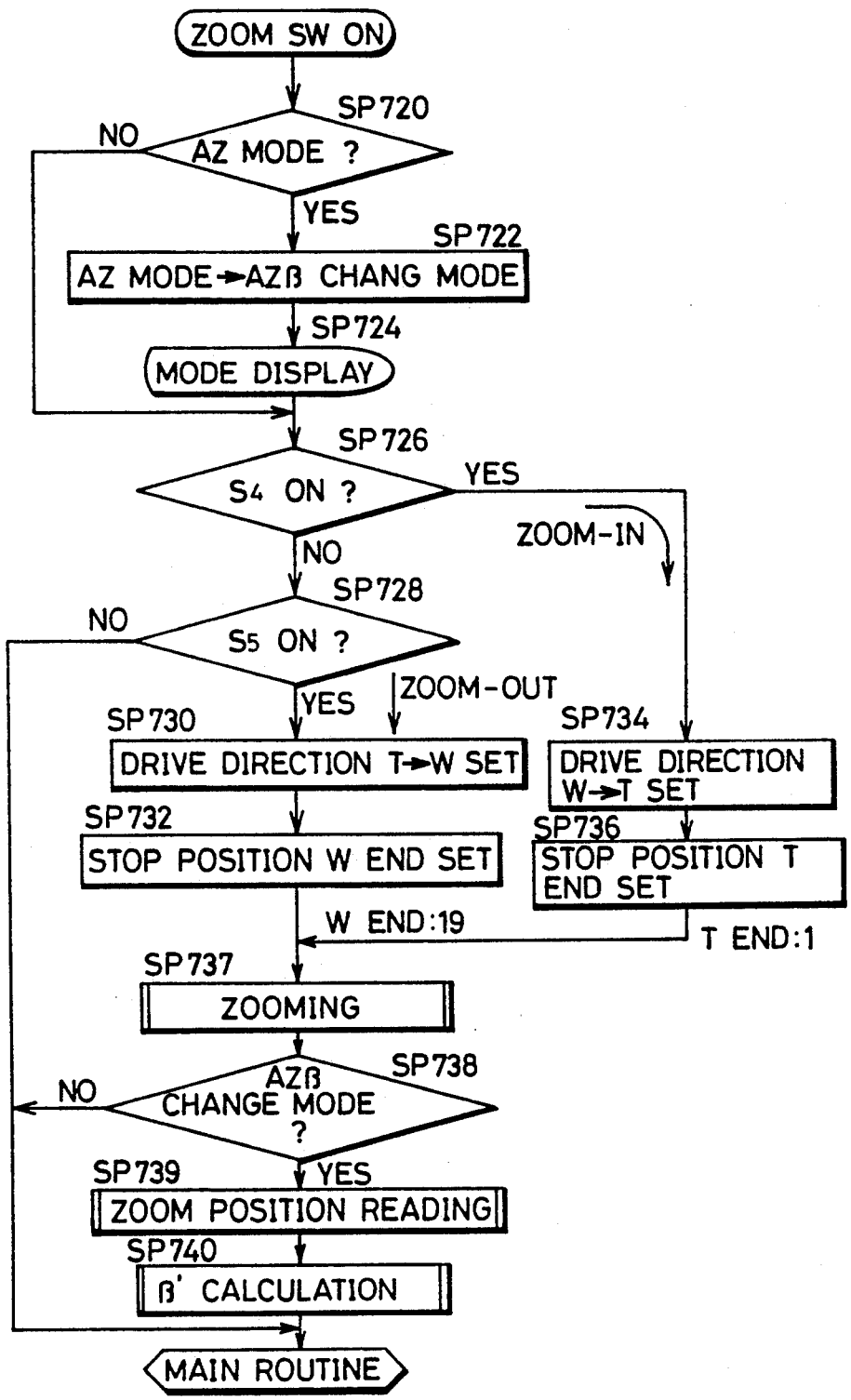

FIG. 45 corresponds to FIG. 12 of the first embodiment. FIG. 45 shows a subroutine in the case where the zoom operation lever 14 is operated to turn on either the zoom-in switch S4 or the zoom-out switch S5. When the zoom-in switch S4 or the zoom-out switch S5 is turned on, it is determined whether the photographing mode is the AZ mode or not (in step SP720). If it is the AZ mode, the photographing mode is changed from the AZ mode to the AZ$\beta$ change mode (in step SP722) and the mode is displayed (in step SP724).

In the AZB change mode, AZ calculation is subsequently performed with the magnification $\beta'$ changed after the zooming operation by means of the zoom switch. Consequently, while in the AZ mode the magnification is fixed to $\beta = 1/60$ for example, it is possible in the AZ$\beta$ change mode to change freely the magnification because the user can visually confirm the magnification referring to the image in the finder during zooming operation.

After it is determined in step SP720 that the photographing mode is not the AZ mode or after the mode display in step SP724, it is determined whether the zoom-in switch S4 is on or not. If the zoom-in switch S4 is on, the direction of drive of the taking lens 12 is set to the tele direction (in step SP734) and the stop position of the taking lens 12 is set to the tele end (in step SP736). If the zoom-in switch S4 is off, it is determined whether the zoom-out switch S5 is on or not. If the zoom-out switch S5 is on, this means the instruction of zoom-out operation and, accordingly, the direction of drive of the taking lens 12 is set to the wide direction (in step SP730) and the stop position of the taking lens 12 is set to the wide end (in step SP732). After that, when the processing flow returns from the zooming subroutine (in step SP737), it is determined in step SP738 whether the photographing mode is the AZβ change mode or not. If it is the AZβ mode, the zoom position is read and, based on the distance D to the object measured immediately before, the magnification in the zoom position is calculated as below (in step SP740).

$$\beta' = f/D$$

The calculated magnification $\beta'$ is stored in the RAM of the control CPU 1 and, in the AZβ change mode, auto zooming is effected based on the magnification $\beta'$. After it is determined in step SP728 that the zoom-out switch S5 is off, or after the calculation of $\beta'$ in step SP740, the processing flow returns to the main routine. It is possible to provide the below described construction. Storing means for storing the calculated magnification $\beta'$ is provided and a switch other than the zoom switches S4 and S5 is provided to set the AZβ change mode. Thus, the AZβ change mode can be selected by operation of that switch and the previously calculated magnification $\beta'$ can be called.

According to third embodiment, the reference table as indicated in step SP202 in FIG. 7 is prepared in the below described manner. The product of the parameter D and the photographing magnification data β defined in advance by the photographing mode is calculated, whereby the focal length f is obtained. It is to be noted that if the photographing mode is the AZβ change mode, the magnification is the change value $\beta'$ not β.

Figure 46:
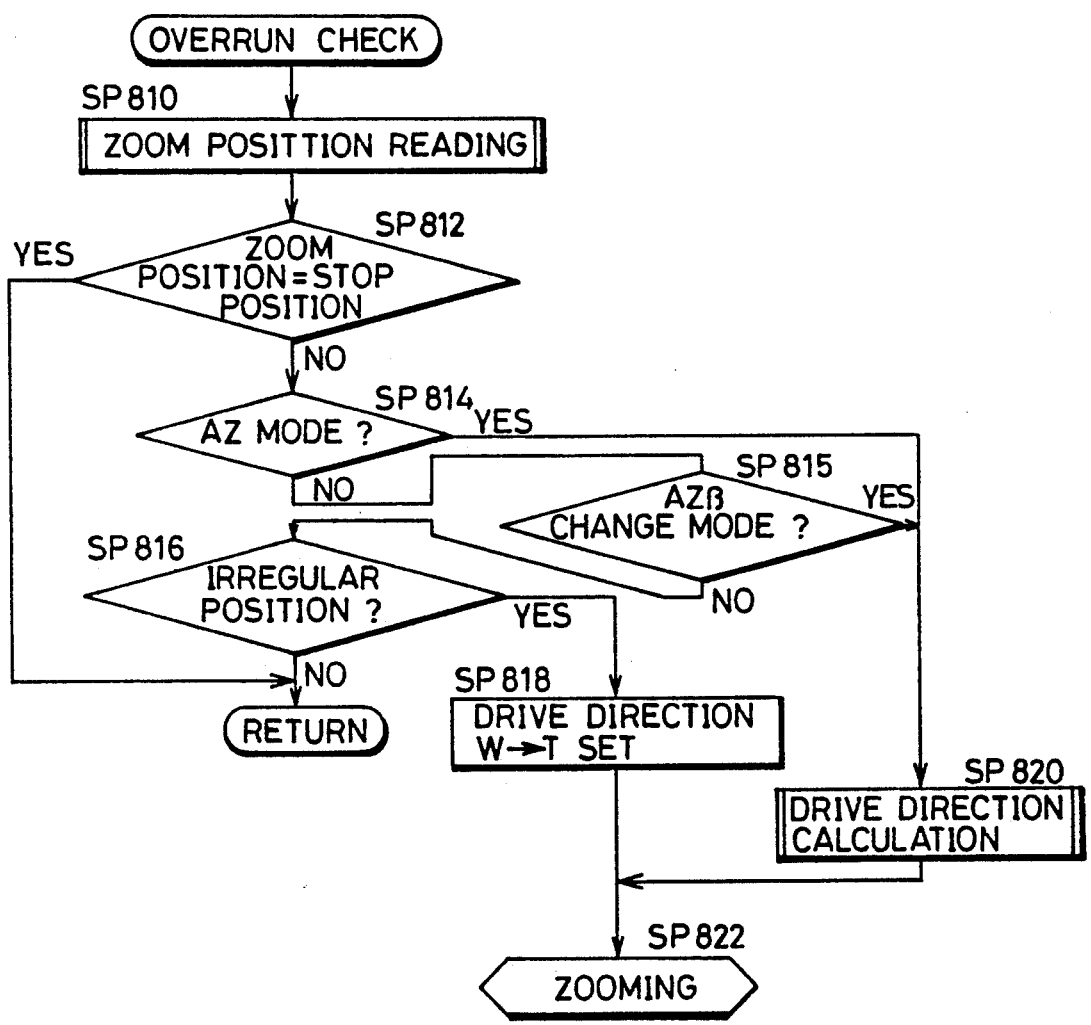

FIG. 46 is a flow chart showing an overrun check subroutine corresponding to FIG. 30 of the first embodiment. According to the third embodiment, only when the photographing mode is the AZ mode and not the AZβ change mode (in steps SP814 and SP815), it is determined whether or not the lens 12 is in the irregular position (in step SP816).

Figure 47:
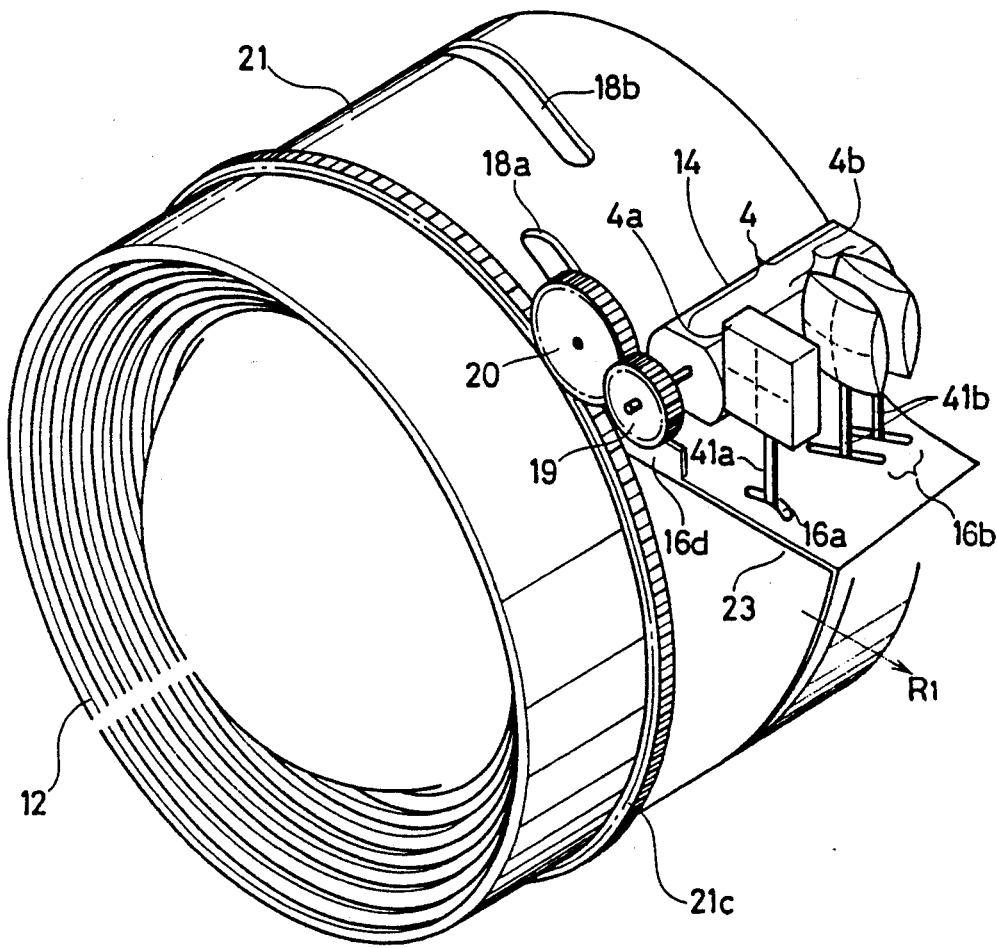
FIG. 47 is a diagram showing an optical system of a taking lens and a finder.

Referring to FIG. 47, an optical system including a taking lens and a finder in a camera according to a further embodiment of the present invention will be described. The finder is a zoom finder including an objective lens 4.

The objective lens 4 includes a front group 4a and a rear group 4b and it enables a focal length of the finder 2 to change in a range corresponding to the variable range of the focal length of the taking lens 12. The objective lens 4 is adapted to move simultaneously with the movement of the taking lens 12 so that the focal length of the finder 2 constantly corresponds to the focal length of the taking lens 12 as described below.

The external surface of a lens barrel 21 is provided with a gear portion 21C which engages with a gear 19 fixed to a rotation shaft of a zoom motor M1 through a gear 20 for rotation speed adjustment. When the zoom motor M1 is driven in the regular direction (clockwise), the rotation force is transmitted to the lens barrel 21 through the gears 19, 20 and the gear portion 21C, so that the lens barrel 21 is rotated regularly. When the lens barrel 21 is rotated regularly, support members 41a and 41b of the front and rear groups 4a and 4b, respectively, of the objective lens 4 engage slidably with cam grooves 16a and 16b provided in a cam plate 16 and at the same time those support members engage movably in straight guide grooves (not shown) of a straight advancing guide plate 23 provided under the cam plate 16. A rack portion 16d is formed in a front edge portion of the cam plate 16 and the above mentioned gear 19 engages also with this rack portion 16d. When the zoom motor M1 is driven regularly, the rotation force is transmitted to the cam plate 16 and the cam plate 16 is moved horizontally in a direction away from the taking lens 12 (the direction of the arrow R1 in the figure). The horizontal movement of the cam plate 16 enables the front and rear groups 4a and 4b of the objective lens 4 to be pushed by the cam grooves 16a and 16b and to move forward along the straight guide grooves in the optical axis while a relative distance therebetween is being reduced (the focal length is being increased) at different speeds. When the zoom motor M1 is driven reversely (counterclockwise), the lens barrel 21 and the cam plate 16 are operated in the manner opposite to the above described operation and the taking lens 12 and the finder 2 are moved rearward while the focal lengths thereof are being decreased. As described above, by the drive of the zoom motor M1, the taking lens 12 and the objective lens 4 of the finder 2 are moved together so that the focal length of the taking lens 12 and that of the finder 2 constantly correspond to each other in a suitable manner.

According to the present invention, the field angle is changed by driving a part of the taking lens. However, it is also possible to change the field angle by using a pseudo focal length camera (as disclosed in U.S. Pat. Nos. 4,768,047 and 4,650,304).

In such a pseudo focal length camera, only the finder excluding the gear 20 in FIG. 47 is driven in order to confirm a change in the field angle so that data of pseudo focal length may be recorded in a film or stored in a memory (not shown).

In such a pseudo focal length camera, it is necessary to additionally provide an encoder and a processing circuit for focal length detection in the finder drive mechanism.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A camera comprising:
   a taking lens for zooming including a plurality of lens elements,
   an operable member,
   distance measuring means for detecting a distance to an object in response to operation of said operable member,
   focal length determining means for determining a prescribed focal length corresponding to a desired photographing range, according to the distance obtained by said distance measuring means,
   drive means for driving at least a part of said lens elements to set the prescribed focal length determined by said focal length determining means, detecting means for detecting operation or non-operation of said operable member, and control means for stopping the drive of said drive means when the non-operation of said operable member is detected by said detecting means during the drive of said drive means, even if a focal length of said taking lens does not attain said prescribed focal length.

2. A camera comprising:

a finder for zooming including a plurality of lens elements, an operable member, distance measuring member for detecting a distance to an object in response to operation of said operable member, field angle determining means for determining a field angle according to the distance detected by said distance measuring means, drive means for driving at least a part of said lens elements to set the field angle determined by said field angle determining means, detecting means for detecting operation or non-operation of said operable member, and control means for stopping the drive of said drive means when the non-operation of said operable member is detected by said detecting means during the drive of said drive means, even if a field angle of said finder does not attain said determined field angle.

3. A camera in accordance with claim 2, further comprising trimming data storing means for storing data for trimming corresponding to said field angle determined by said field angle determining means.

4. A camera comprising:

a taking lens for zooming including a plurality of lens elements, photographing preparation instructing means for providing an instruction signal instructing a preparation for photographing, distance measuring means for detecting a distance to an object in response to said instruction signal, focal length determining means for determining a prescribed focal length corresponding to a desired photographing range, according to the distance detected by said distance measuring means, drive means for driving at least a part of said lens elements to set the focal length determined by said focal length determining means, and control means for stopping the drive of said drive means in absence of said instruction signal during the drive of said drive means, even if a focal length of said taking lens does not attain said prescribed focal length.

5. A camera comprising:

a finder for zooming including a plurality of lens elements, photographing preparation instructing means for providing an instruction signal instructing a preparation for photographing, distance measuring means for detecting a distance to an object in response to said instruction signal, field angle determining means for determining a field angle according to the distance detected by said distance measuring means, drive means for driving at least a part of said lens elements to set the field angle determined by said field angle determining means, and control means for stopping the drive of said drive means in absence of said instruction signal during the drive, even if a focal length of said finder does not attain said determined focal length.

6. A camera in accordance with claim 5, further comprising trimming means for trimming according to the field angle determined by said field angle determining means.

7. A camera comprising:

a taking lens for zooming including a plurality of lens elements, distance measuring means for detecting a distance to an object, focal length determining means for determining a prescribed focal length corresponding to a desired photographing range, according to the distance detected by said distance measuring means, drive means for driving at least a part of said lens elements to set the prescribed focal length obtained by said focal length determining means, focus adjusting means for automatically driving a focusing lens in the taking lens to an in-focus point, an operable member, release means for performing photographing operation in response to operation of said operable member, and controlling means, operable when said operable member is operated during a drive operation by said drive means, for controlling said drive means to stop driving, for controlling said focus adjusting means such that a focus adjusting operation is started, and for performing the photographing operation by said release means after completion of the focus adjusting operation.

8. A camera in accordance with claim 7, wherein said focus adjusting means operates based on the distance detected by said distance measuring means.

9. A camera comprising:

a taking lens for zooming including a plurality of lens elements, distance measuring means for detecting a distance to an object, focal length determining means for determining a prescribed focal length corresponding to a desired photographing range, according to the distance detected by said distance measuring means, drive means or driving at least a part of said lens elements to set the prescribed focal length obtained by said focal length determining means, focus adjusting means for automatically driving a focusing lens included in the taking lens to an in-focus point, an operable member, release means for performing photographing operation in response to operation of said operable member, and controlling means for performing the photographing operation by said release means after the focus adjusting operation has been completed when said operable member is operated, even if the driving operation by said drive means has not been completed.

10. A camera comprising:

a taking lens for zooming including a plurality of lens elements, distance measuring means for detecting a distance to an object, focal length determining means for determining a prescribed focal length corresponding to a desired photographing range, according to the distance detected by said distance measuring means, drive means for driving at least a part of said lens elements to set the prescribed focal length obtained by said focal length determining means, focus adjusting means for automatically driving a focusing lens including in the taking lens to an in-focus point, an operable member, release means for performing photographing operation in response to operation of said operable member, and controlling means, for forbidding the driving operation by said drive means and for permitting the focus adjusting operation by said focus adjusting means, when said operable member is operated prior to the completion of the driving operation by said drive means.

11. A camera in accordance with claim 10, wherein said release means performs the photographing operation after the focus adjusting operation has been completed.

12. A camera comprising:

a zooming finder for zooming, distance measuring means for measuring a distance to an object, field angle determining means for determining a field angle according to the distance obtained by said distance measuring means and determining a focal length of said finder corresponding to said field angle, drive means for driving at least a part of said finder to set the field angle determined by said field angle determining means, focus adjusting means for automatically driving a focusing lens in a taking lens to an in-focus point, an operable member, releasable means for performing photographing operation in response to operation of said operable member, and controlling means, operable when said operable member is operated during the drive operation by said drive means, for controlling said driving means to stop driving, for controlling said focus adjusting means such that the focus adjusting operation is started, and for performing the photographing operation by said release means after completion of the focus adjusting operation.

13. A camera in accordance with claim 12, wherein said focus adjusting means operates based on the distance detected by said distance measuring means.

14. A camera comprising:

a zooming finder which enables zooming, distance measuring means for measuring a distance to an object, field angle determining means for determining a field angle according to the distance obtained by said distance measuring means and determining a focal length of said finder corresponding to said field angle, drive means for driving at least a part of said finder to set the field angle determined by said field angle determining means, focus adjusting means for automatically driving a focusing lens included in a taking lens to an in-focus point, an operable member, release means for preforming photographing operation in response to operation of said operable member, and controlling means for performing the photographing operating by said release means after the focus adjusting operation has been completed when said operable member is operated, even if the driving operation by said drive means has not been completed.

15. A camera comprising:

a zooming finer which enables zooming, distance measuring means for measuring a distance to an object, field angle determining means for determining a field angle according to the distance obtained by said distance measuring means and determining a focal length of said finder corresponding to said field angle, drive means for driving at least a part of said finder to set the field angle determined by said field angle determining means, focus adjusting means for automatically driving a focusing lens included in a taking lens to an in-focus point, an operable member, release means for performing photographing operation in response to operation of said operable member, and controlling means for forbidding the driving operation by said drive means and for permitting the focus adjusting operation by said focus adjusting means when said operable member is operated prior to the completion of the driving operation by said drive means.

16. A camera in accordance with claim 15, wherein said release means performs the photographing operation after the focus adjusting operation has been completed.

17. A camera comprising:

taking lens for zooming including a plurality of lens elements, distance measuring means for detecting a distance to an object, focal length determining means for determining a prescribed focal length corresponding to a desired photographing range, according to the distance detected by said distance measuring means, drive means for driving at least a part of said lens elements to set the prescribed focal length obtained by said focal length determining means, light measuring means for measuring a brightness of the object, calculating means for calculating an exposure control value based on the brightness measured by said measuring means and the focal length determined by said focal length determining means, an operable member, release means for performing photographing operation according to the exposure control value calculated by said calculating means in response to an operation of said operable member, and controlling means, operable after said operable member is operated, for forbidding the driving operation by said drive means even if the driving operation has not been completed, and for altering the exposure control value based on a focal length at a timing when the driving operation is forbidden.

18. A camera comprising:

a taking lens for zooming including a plurality of lens elements, distance measuring means for detecting a distance to an object, focal length determining means for determining a prescribed focal length corresponding to a desired photographing range, according to the distance detected by said distance measuring means, drive means for driving at least a part of said lens elements to set the prescribed focal length obtained by said focal length determining means, calculating means for calculating a control value based on the focal length determined by said focal length determining means, an operable member, means for performing a predetermined operation according to the control value calculated by said calculating means in response to an operation of said operable member, and controlling means operable after said operable member is operated, for forbidding the driving operation by said drive means even if the driving operation has not been completed, and for altering the control value based on a focal length at a timing when the driving operation is forbidden.

19. A camera comprising:

taking lens for zooming including a plurality of lens elements, distance measuring means for detecting a distance to an object, focal length determining means for determining a prescribed focal length corresponding to a desired photographing range, according to the distance detected by said distance measuring means, drive means for driving at least a part of said lens elements to set the prescribed focal length obtained by said focal length determining means, light measuring means for measuring a brightness of the object;

calculating means for calculating an exposure control value based on the brightness measured by said measuring means, an operable member, release means for performing photographing operation according to the exposure control value calculated by said calculating means in response to an operation of said operable manner, and controlling means, operable after said operable member is operated, for forbidding the driving operation by said drive means even if the driving operation has not been completed, and for altering the exposure control value based on a focal length at a timing when the driving operation is forbidden.

20. A camera comprising:

a zooming finder which enables zooming, distance measuring means for measuring a distance to an object, field angle determining means for determining a field angle according to the distance obtained by said distance measuring means and determining a focal length of said finder corresponding to said field angle, drive means for driving at least a part of said finder to set the field angle determined by said field angle determining means, light measuring means for measuring a brightness of the object, calculating means for calculating an exposure control value based on the brightness measured by said measuring means and the field angle determined by said field angle determining means, an operable member, release means for performing photographing operation according to the exposure control value calculated by said calculating means in response to an operation of said operable member, and controlling means, operable after said operable member is operated, for forbidding the driving operation by said driven means even if the driving operation has not been completed, and for altering the exposure control value based on a focal length at a timing when the driving operation is forbidden.

21. A camera comprising:

a zooming finder which enables zooming, distance measuring means for measuring a distance to an object, field angle determining means for determining a field angle according to the distance obtained by said distance measuring means and determining a focal length of said finder corresponding to said field angle, drive means for driving at least a part of said finder to set the field angle determined by said field angle determining means, calculating means for calculating a control value based on the field angle determined by said field angle determining means, an operable member, means for performing a predetermined operation according to the control value calculated by said calculating means in response to an operation of said operable member, and controlling means, operable after said operable member is operated, for forbidding the driving operation by said drive means even if the driving operation has not been completed, and for altering the exposure control value based on a focal length at a timing when the driving operation is forbidden.

22. A camera comprising:

a zooming finder which enables zooming, distance measuring means for measuring a distance to an object, field angle determining means for determining a field angle according to the distance obtained by said distance measuring means and determining a focal length of said finder corresponding to said field angle, drive means for driving at least a part of said finder to set the field angle determined by said field angle determining means, light measuring means for measuring a brightness of the object, calculating means for calculating an exposure control value based on the brightness measured by said measuring means, an operable member, release means for performing photographing operation according to the exposure control value calculated by said calculating means in response to an operation of said operable member, and controlling means, operable after said operable member is operated, for forbidding the driving operation by said drive means even if the driving operation has not been completed, and for altering the exposure control value based on a focal length at a timing when the driving operation is forbidden.

* * * * *